US012763481B2

(12) United States Patent
Eguchi

(10) Patent No.: US 12,763,481 B2
(45) Date of Patent: Oct. 13, 2026

(54) WIRELESS COMMUNICATION SYSTEM, RECEPTION APPARATUS, AND CONTROL METHOD

(71) Applicant: CANON KABUSHIKI KAISHA, Tokyo (JP)

(72) Inventor: Tadashi Eguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 163 days.

(21) Appl. No.: 18/769,178

(22) Filed: Jul. 10, 2024

(65) Prior Publication Data

US 2025/0023249 A1 Jan. 16, 2025

(30) Foreign Application Priority Data

Jul. 10, 2023 (JP) ................................ 2023-112921

(51) Int. Cl.

*H01Q 13/20* (2006.01)
*H01Q 1/50* (2006.01)
*H04L 25/02* (2006.01)

(52) U.S. Cl.

CPC ............. *H01Q 13/206* (2013.01); *H01Q 1/50* (2013.01); *H04L 25/0272* (2013.01)

(58) Field of Classification Search

CPC ..... H01Q 13/206; H01Q 1/50; H04L 25/0272
See application file for complete search history.

(56) References Cited

U.S. PATENT DOCUMENTS

| | | | | |
|---|---|---|---|---|
| 2008/0048800 | A1* | 2/2008 | Dutta | H01P 3/003 333/164 |
| 2010/0097160 | A1* | 4/2010 | Yamauchi | H01P 5/16 333/109 |
| 2010/0282504 | A1* | 11/2010 | Chang | H01P 11/003 174/268 |
| 2017/0026020 | A1* | 1/2017 | Solomko | H03H 7/48 |
| 2019/0028064 | A1* | 1/2019 | Lee | H03G 3/3042 |
| 2022/0158691 | A1* | 5/2022 | Eguchi | H01Q 7/00 |

FOREIGN PATENT DOCUMENTS

JP 2003533114 A 11/2003

* cited by examiner

*Primary Examiner* — Samuel S Outten
(74) *Attorney, Agent, or Firm* — Canon U.S.A., Inc. IP Division

(57) ABSTRACT

A wireless communication system includes a transmission apparatus and a reception apparatus. The transmission apparatus includes two or more sending transmission lines located with feeding points of a signal or termination points opposed to each other, and a transmission unit configured to input the signal to the feeding points of the two or more sending transmission lines. The reception apparatus includes a receiving transmission line configured to establish electromagnetic field coupling with the sending transmission lines, and a comparator configured to input signals from one end and the other end of the receiving transmission line.

16 Claims, 24 Drawing Sheets

WIRELESS COMMUNICATION SYSTEM, RECEPTION APPARATUS, AND CONTROL METHOD

BACKGROUND

Field of the Disclosure

The present disclosure relates to a wireless communication system including a movable transmission line, a reception apparatus, and a control method.

Description of the Related Art

To solve issues such as entangled cables in controlling a device having a rotating movable part, such as a robot hand unit and a network camera, through communication over a network, techniques for performing data communication in a cableless manner via the rotating movable part have been discussed in recent years.

For example, Japanese Unexamined Patent Application Publication (Translation of PCT Application) No. 2003-533114 discusses the disclosure of an apparatus that transmits a wideband signal between at least two units mutually movable along a given path by contactless electromagnetic signal coupling. The apparatus includes two conductor structures (sending transmission lines) extending along the path of the units in respective opposite directions from the feeding points of a transmission signal from a transmitter T1, and two directional couplers (receiving transmission lines) that receive signals flowing through the conductor structures. The two directional couplers are arranged with their signal output ends opposed to each other along the path. The two directional couplers thus arranged move over the conductor structures along the path and each receive the signals flowing through the conductor structures in a non-contact manner by electromagnetic signal coupling. The two signals received by the two directional couplers are combined or exclusively switched by a changeover switch at the subsequent stage, and output to a demodulator.

SUMMARY

According to an aspect of the present disclosure, a wireless communication system includes a transmission apparatus including at least two sending transmission lines located with at least either feeding points of a signal or termination points opposed to each other, and a transmission unit configured to input a signal to each of the feeding points of the at least two sending transmission lines, and a reception apparatus including a receiving transmission line configured to move along the at least two sending transmission lines, establish electromagnetic field coupling with the sending transmission lines, and receive an excited signal, and an output unit configured to receive respective signals from one end and another end of the receiving transmission line and output a signal to be subjected to demodulation processing based on the received signals.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the attached drawings.

The following exemplary embodiments are examples of means for implementing the present disclosure. Changes or modifications are to be made as appropriate depending on the configurations and various conditions of apparatuses to which the exemplary embodiments are applied, and the present disclosure is not limited to the following exemplary embodiments.

(Description of Principle of Receiving Transmission Line)

Prior to the description of the exemplary embodiments of the present disclosure, a principle common to the exemplary embodiments, specifically, signal characteristics at a coupled end and an isolation end of a receiving transmission line and various components will initially be described.

Figure 22A:
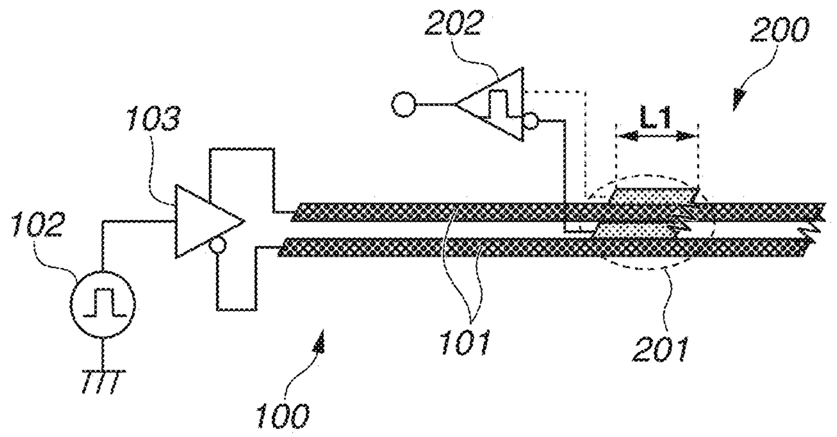
FIGS. 22A and 22B are system configuration diagrams for describing a common principle according to one or more aspects of the present disclosure.
Figure 22B:
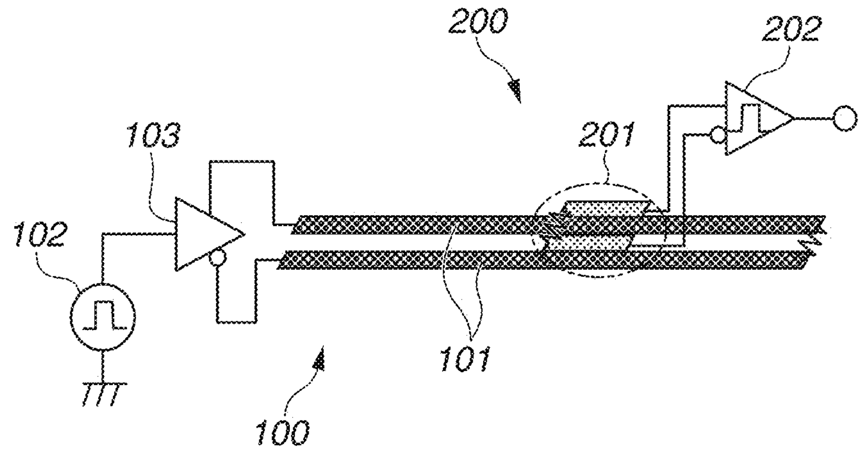
Figure 23A:
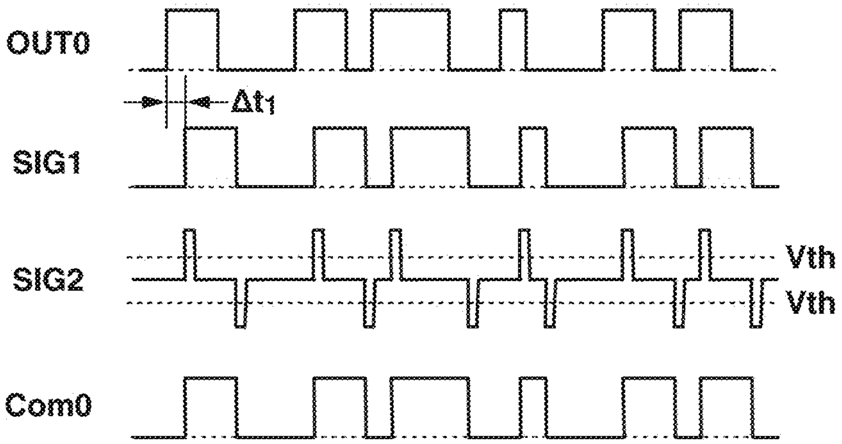
FIGS. 23A and 23B are timing charts for describing the common principle according to one or more aspects of the present disclosure.
Figure 23B:
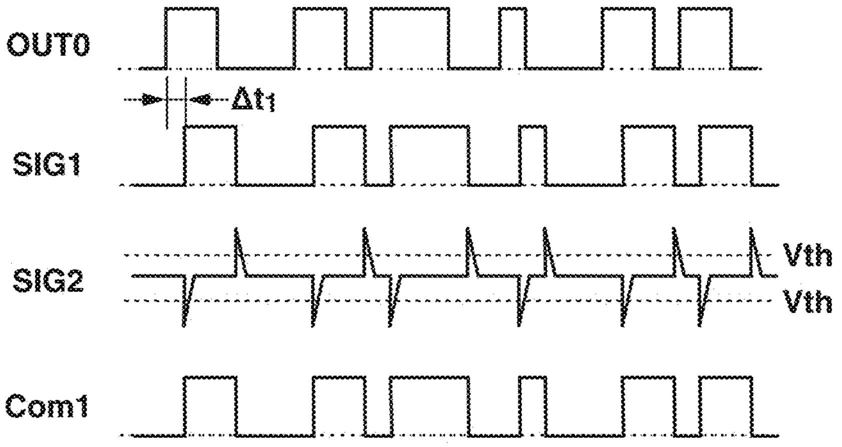

FIGS. 22A and 22B are diagrams for describing the coupled end and the isolation end of a receiving transmission line in a wireless communication system. FIGS. 23A and 23B are timing charts of signals of various components in the wireless communication systems of FIGS. 22A and 22B.

The wireless communication system illustrated in FIG. 22A includes a transmission apparatus 100 and a reception apparatus 200. The transmission apparatus 100 includes a sending transmission line 101, a signal source 102, and a differential transmission buffer 103. The reception apparatus 200 includes a receiving transmission line 201 and a comparator 202.

The sending transmission line 101 includes differential lines. Differential signals from the differential transmission buffer 103 are input to one end of the sending transmission line 101. The other end of the sending transmission line 101 is terminated by a termination resistor.

The receiving transmission line 201 includes differential lines. The end of the receiving transmission line 201 on the same side as where the sending transmission line 101 is terminated is terminated by a termination resistor. The receiving transmission line 201 moves over the sending transmission line 101 along the sending transmission line 101, establishes electromagnetic field coupling with the sending transmission line 101, and receives an excited signal in a non-contact manner (wirelessly). In other words, the receiving transmission line 201 constitutes a directional coupler. The signal output end of the receiving transmission line 201 when the receiving transmission line 201 is terminated at the end on the same side as where the sending transmission line 101 is terminated is referred to as a coupled end.

The wireless communication system illustrated in FIG. 22B is configured such that the end on the signal output side and the end on the terminated side of the receiving transmission line 201 in the wireless communication system of FIG. 22A are reversed. Specifically, the end of the receiving transmission line 201 on the side opposite to where the sending transmission line 101 is terminated is terminated by the termination resistor. The signal output end of the receiving transmission line 201 in such a case is referred to as an isolation end.

In FIGS. 23A and 23B, the horizontal axis indicates time, and the vertical axis indicates voltage. In both the wireless communication systems of FIGS. 22A and 22B, the signal source 102 outputs an output signal OUT0. a signal SIG1 indicates a signal near the receiving transmission line 201 of the sending transmission line 101, and a signal SIG2 is detected on the receiving transmission line 201. The comparator 202 of FIG. 22A outputs an output signal Com0. The comparator 202 of FIG. 22B outputs an inverted output signal Com1.

As indicated by the signal SIG2 in FIG. 23A, if the receiving transmission line 201 outputs a signal from the coupled end, the output signal of the receiving transmission line 201 is an edge signal with a pulse width corresponding in time to the length L1 of the receiving transmission line 201. By contrast, as indicated by the signal SIG2 in FIG. 23B, if the receiving transmission line 201 outputs a signal from the isolation end, the output signal of the receiving transmission line 201 is an inverted edge signal with an extremely short pulse width in time.

(Issues of Conventional Techniques)

Next, to further clarify the issues of conventional techniques, an operation of the conventional technique discussed in Japanese Unexamined Patent Application Publication (Translation of PCT Application) No. 2003-533114 will be described with specific examples.

FIGS. 24A, 24B, 24C, and 24D are diagrams for describing the operation of a wireless communication system according to the conventional technique.

As illustrated in FIGS. 24A to 24D, the wireless communication system according to the conventional technique includes a transmission apparatus 300 and a reception apparatus 400. The transmission apparatus 300 includes sending transmission lines 301 and 302, a signal source 303, and a transmission buffer 304. The reception apparatus 400 includes receiving transmission lines 401 and 402, a first comparator 403, a second comparator 404, and a changeover switch 405.

The sending transmission lines 301 and 302 are arranged in an annular shape so that their feeding points, or signal input ends, and their termination points, or the other ends terminated by termination resistors, are located near and opposed to each other.

The receiving transmission lines 401 and 402 are two transmission lines configured so that their signal output ends are located near and opposed to each other. The receiving transmission lines 401 and 402 are configured so that their total length including the opposing gap is smaller than the length of each of the sending transmission lines 301 and 302. The receiving transmission lines 401 and 402 are configured to move over and along the sending transmission lines 301 and 302 and receive signals flowing through the sending transmission lines 301 and 302 in a non-contact manner by electromagnetic signal coupling.

As illustrated in FIGS. 24A to 24D, the reception apparatus 400 is configured so that the receiving transmission lines 401 and 402 move over and along the sending transmission lines 301 and 302 clockwise. During the movement from FIG. 24A to FIG. 24B, the output of the receiving transmission line 401 is that of a coupled end, and edge pulses having a time length corresponding to the length of the receiving transmission line 401 are obtained. By contrast, the output of the receiving transmission line 402 is that of an isolation end while the receiving transmission line 401 is located on the sending transmission line 301. Edge pulses of inverted signs from at the coupled end are output in short time lengths.

When the receiving transmission line 402 starts to move over the sending transmission line 302, the receiving transmission line 402 outputs a combined signal of the signal component of an isolation end and the signal component of a coupled end. At the position of FIG. 24B, the output of the receiving transmission line 402 becomes that of only the coupled end.

Figure 24A:
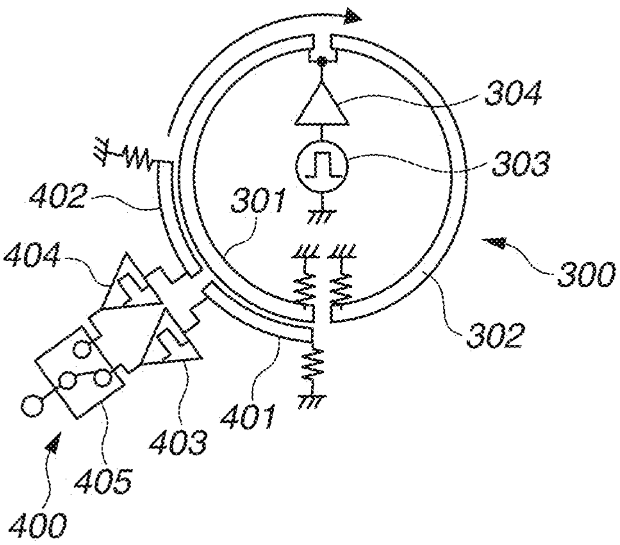
FIG.24A PRIOR ART
FIGS. 24A to 24D are schematic diagrams for describing the operation of a conventional technique.
Figure 24B:
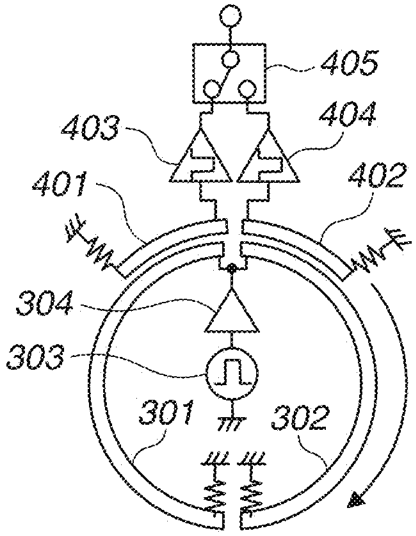
FIG.24B PRIOR ART
Figure 24C:
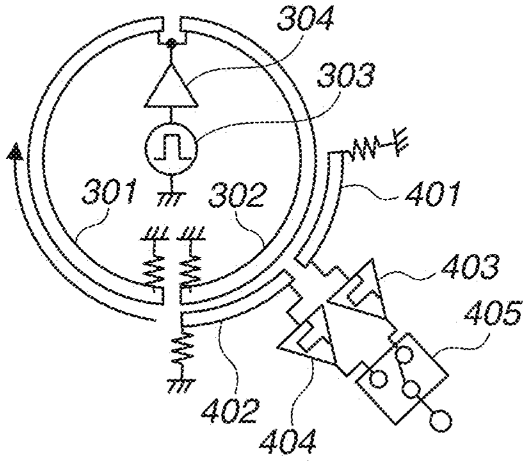
FIG.24C PRIOR ART

During the movement from FIG. 24B to 24C, the output of the receiving transmission line 402 is that of the coupled end, and edge pulses having a time length corresponding to the length of the receiving transmission line 402 are obtained. By contrast, when the receiving transmission line 401 starts to move over the sending transmission line 302, the receiving transmission line 401 outputs a combined signal of the signal component of an isolation end and the signal component of a coupled end. Then, when the receiving transmission line 401 has fully moved onto the sending transmission line 302, the output signal of the receiving transmission line 401 becomes that of only the isolation end.

During the movement from FIG. 24A to FIG. 24C, at least either one of the receiving transmission lines 401 and 402 outputs the signal of a coupled end. At the movement position of FIG. 24B, the changeover switch 405 can therefore switch to the output signal of the coupled end.

Figure 24D:
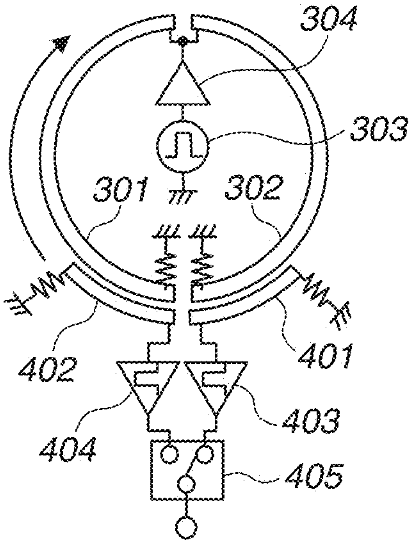
FIG.24D PRIOR ART

Now, during the movement from FIG. 24C to FIG. 24D, the output of the receiving transmission line 401 is that of an isolation end. Meanwhile, the receiving transmission line 402 outputs a combined output of the signal component of a coupled end and the signal component of an isolation end. At the movement position of FIG. 24D, the output of the receiving transmission line 402 becomes that of only the isolation end. The isolation-end output component therefore exceeds the coupled-end output component at somewhere between FIGS. 24C and 24D regardless of whether the outputs of the receiving transmission lines 401 and 402 are switched or combined. As a result, the sign of the edge signal is reversed, and the output signals of the receiving transmission lines 401 and 402 both become unusable for demodulation processing of the signal input to the sending transmission lines 301 and 302.

As described above, the output from a coupled end becomes unavailable during the movement from FIG. 24C to FIG. 24A via 24D. This interferes with normal signal reception.

Next, a first exemplary embodiment of the present disclosure will be described. FIGS. 1 to 7 are diagrams illustrating the first exemplary embodiment.

[First Configuration Example]

Figure 1:
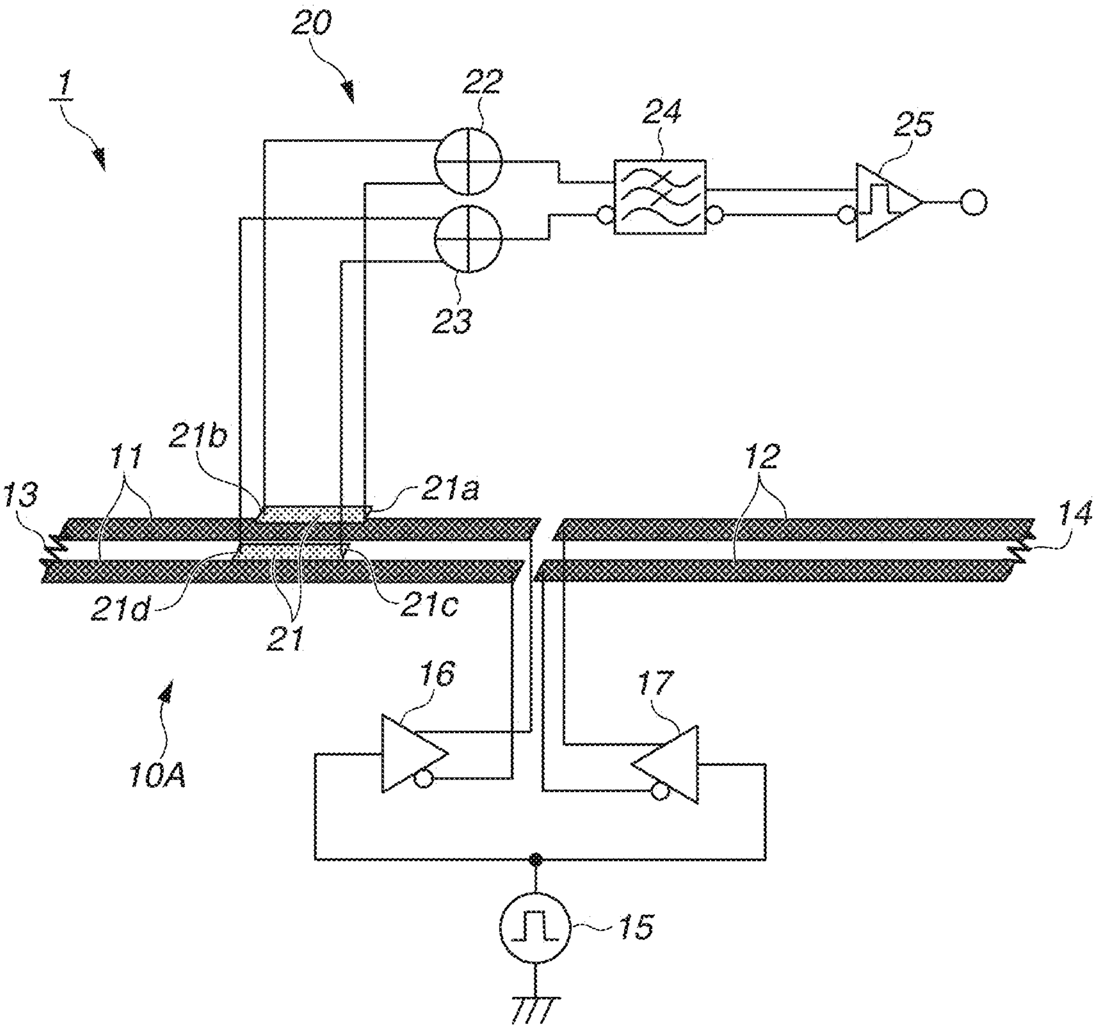
FIG. 1 is a diagram illustrating a first configuration example of a wireless communication system according to one or more aspects of the present disclosure.

FIG. 1 is a diagram illustrating a first configuration example of a wireless communication system according to the first exemplary embodiment.

As illustrated in FIG. 1, a wireless communication system 1 according to the first configuration example includes a transmission apparatus 10A and a reception apparatus 20.

The transmission apparatus 10A includes sending transmission lines 11 and 12 (each line includes a pair of transmission lines), termination resistors 13 and 14, a signal source 15, and differential transmission buffers 16 and 17.

The sending transmission lines 11 and 12 each include differential lines of the same length, and their feeding points, or respective signal input ends, are located near and opposed to each other. The termination resistors 13 and 14 substantially equivalent to the characteristic impedance of the sending transmission line 11 are electrically connected to the other ends of the sending transmission lines 11 and 12 opposite the feeding points. In other words, the other ends of the sending transmission lines 11 and 12 terminated by the termination resistors 13 and 14 constitute signal termination points.

The signal source 15 outputs a signal (hereinafter, referred to as "transmission signal") corresponding to transmission data. The differential transmission buffers 16 and 17 are both electrically connected to the signal source 15, and amplify the transmission signal input from the signal source 15 and convert the amplified transmission signal into differential signals. In other words, the differential transmission buffers 16 and 17 each output the amplified transmission signal from one of their two output terminals, and output the amplified transmission signal with an inverted sign from the other.

One of the two output terminals of the differential transmission buffer 16 is electrically connected to the feeding point of one of the differential lines of the sending transmission line 11. The other is electrically connected to the feeding point of the other differential line of the sending transmission line 11. One of the two output terminals of the differential transmission buffer 17 is electrically connected to the feeding point of one of the differential lines of the sending transmission line 12. The other is electrically connected to the feeding point of the other differential line of the sending transmission line 12.

In the wireless communication system 1 of FIG. 1, the differential transmission buffers 16 and 17 and the signal source 15 are schematically directly connected by signal lines. However, such a configuration is not restrictive. For example, in the case of dividing a radio frequency signal from the signal source 15, a resistive divider or a Wilkinson divider (neither is illustrated) may be inserted. By dividing the signal using such dividers, the signal is input to the differential transmission buffers 16 and 17 in an impedance-matched state at the same timing. The same signal can thus be input to the feeding points of the respective sending transmission lines 11 and 12 at the same timing. This can prevent a situation where the signal of one of the sending transmission lines 11 and 12 delays behind that of the other, even when a receiving transmission line 21 (including a pair of transmission lines) is located over the two opposed feeding points.

The reception apparatus 20 includes the receiving transmission lines 21, combiners 22 and 23, a differential filter 24, and a comparator 25.

The receiving transmission line 21 includes a transmission line including differential lines and is shorter than the sending transmission lines 11 and 12. The receiving transmission line 21 is configured to establish electromagnetic field coupling with the sending transmission lines 11 and 12 and receive excited signals in a non-contact manner (wirelessly).

Here, the electromagnetic field coupling includes coupling via an electric field, coupling via a magnetic field, and coupling via both electric and magnetic fields.

The transmission apparatus 10A is disposed on a stationary structure (not illustrated), for example. The reception apparatus 20 is disposed on a linearly reciprocating structure (not-illustrated), for example. In addition, the transmission apparatus 10A and the reception apparatus 20 are configured so that the receiving transmission lines 21 can reciprocate over and along the sending transmission lines 11 and 12 at an opposing distance in which electromagnetic field coupling is realizable.

Such a configuration is not restrictive. The transmission apparatus 10A may be disposed on a linearly reciprocating structure and the reception apparatus 20 on a stationary structure since the receiving transmission line 21 can move along the sending transmission lines 11 and 12.

A first output end 21*a* that is an end of one of the differential lines constituting the receiving transmission line 21 is electrically connected to one input terminal of the combiner 22 having differential input impedance matched with substantially the same input impedance as the differential impedance of the receiving transmission line 21. A second output end 21*b* that is the other end of the one differential line constituting the receiving transmission line 21 is electrically connected to the other input terminal of the combiner 22.

A third output terminal 21*c* that is an end of the other differential line constituting the receiving transmission line 21 is electrically connected to one input terminal of the combiner 23 having differential input impedance matched with substantially the same input impedance as the differential impedance of the receiving transmission line 21. A fourth output end 21*d* that is the other end of the other differential line constituting the receiving transmission line 21 is electrically connected to the other input terminal of the combiner 23.

In other words, the impedance of the lines between the first to fourth output ends 21*a* to 21*d* of the receiving transmission line 21 and the combiners 22 and 23 is matched with the characteristic impedance of the receiving transmission line 21. The effect of reflected waves can thereby be reduced to reduce the transmission loss of the signals from the output ends of the receiving transmission line 21 to the combiners 22 and 23.

The output terminal of the combiner 22 is electrically connected to one of the two input terminals of the differential filter 24. The output terminal of the combiner 23 is electrically connected to the other of the two input terminals of the differential filter 24.

The combiner 22 combines the signals received from the first and second output ends 21*a* and 21*b* of one of the differential lines constituting receiving transmission line 21, and outputs the resulting first combined signal to the differential filter 24. The combiner 23 combines the signals received from the third and fourth output terminals 21*c* and 21*d* of the other differential line, and outputs a second combined signal obtained by inverting the resulting combined signal to the differential filter 24.

The differential filter 24 is used for reducing isolation-end signal components of the differential combined signals that are the output signals of the combiners 22 and 23. The differential filter 24 includes a low-pass filter, for example.

One of the two output terminals of the differential filter 24 is electrically connected to one of the two input terminals of the comparator 25. The other of the two output terminals of the differential filter 24 is electrically connected to the other of the two input terminals of the comparator 25.

The differential filter 24 outputs, to the comparator 25, the filtered first combined signal and a third combined signal obtained by inverting the filtered second combined signal.

The comparator 25 detects rising and falling edges of a difference signal that has a signal level corresponding to a potential difference between the first and third combined signals input to the two input terminals. The comparator 25 has hysteresis such that "1" is output when the detected edge signal reaches or exceeds a positive threshold voltage Vth, and "0" is output when the detected edge signal falls to or below a negative threshold voltage-Vth.

Specifically, after the detection of a rising edge of the difference signal, the comparator 25 maintains "1" until a falling edge is then detected. After the detection of a falling edge of the difference signal, the comparator 25 maintains "0" until a rising edge is then detected. Thus performing demodulation processing on the combined and filtered reception signal demodulates the transmission signal.

In FIG. 1, grounds for providing reference potentials of the sending transmission lines 11 and 12 and the receiving transmission line 21 are omitted. Each transmission line can be constituted by microstrip lines, coplanar lines, or coplanar lines with a ground, for example. In the first exemplary embodiment, the sending transmission lines 11 and 12 and the receiving transmission line 21 are constituted by microstrip lines.

While the sending transmission lines 11 and 12 and the receiving transmission line 21 are constituted by differential lines, such a configuration is not restrictive, and the transmission lines 11, 12, and 21 may be constituted by single-ended transmission lines. In such a case, the differential transmission buffers 16 and 17 are replaced with single-ended transmission buffers.

In addition, only one of the combiners 22 and 23 is left, and the differential filter 24 is replaced with a single-ended filter.

Figure 2:
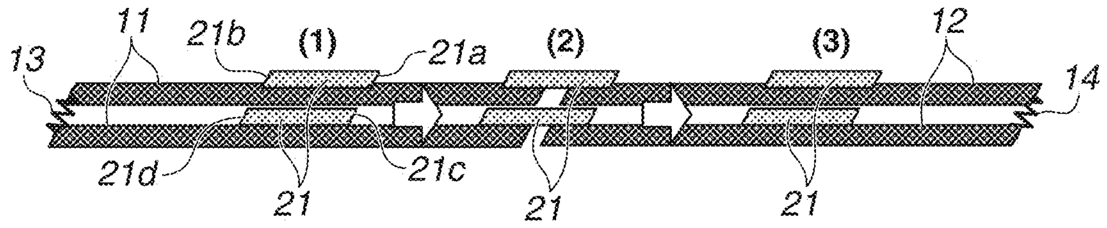
FIG. 2 is a diagram illustrating a transition example of movement positions of receiving transmission lines of FIG. 1.
Figures 3A, 3B, 3C:
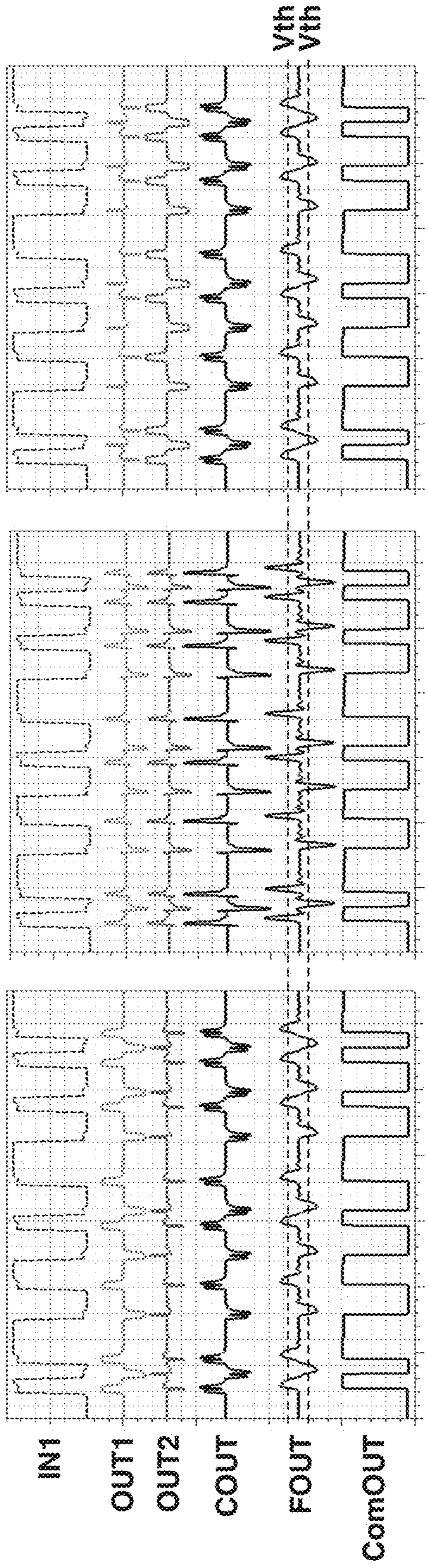
FIGS. 3A to 3C are timing charts of signals of various components at respective movement positions of FIG. 2.

FIG. 2 is a diagram illustrating a transition example of the movement position of the receiving transmission line 21 in the wireless communication system 1 according to the first configuration example. FIGS. 3A, 3B, and 3C are timing charts of the signals of various components at movement positions (1), (2), and (3) in FIG. 2.

In FIGS. 3A to 3C, the horizontal axis indicates time, and the vertical axis voltage. In FIGS. 3A to 3C, the signals output from the respective components, which originally are differential signals, are illustrated as difference signals corresponding to potential differences between the respective pairs of differential signals for the convenience of description.

More specifically, in FIGS. 3A to 3C, a difference signal IN1 represents the difference signal between the differential signals input to the feeding points of the sending transmission lines 11 and 12. A difference signal OUT1 represents the difference signal between the differential signals output from the first and third output ends 21*a* and 21*c* of the receiving transmission line 21. A difference signal OUT2 represents the difference signal between the differential signals output from the second and fourth output ends 21*b* and 21*d* of the receiving transmission line 21. A difference signal COUT represents the difference signal between the differential combined signals output from the combiners 22 and 23. A difference signal FOUT represents the difference signal between the differential combined signals filtered by the differential filter 24. An output signal ComOUT represents the output signal output from the comparator 25.

As illustrated in FIG. 2, the receiving transmission line 21 transitions to each of first, second, and third positions (1), (2), and (3) denoted by (1), (2), and (3) in the diagram with respect to the sending transmission lines 11 and 12 through straightforward movement.

The first position (1) is where the entire receiving transmission line 21 is located on the sending transmission line 11. The second position (2) is where the receiving transmission line 21 lies over the feeding points of the sending transmission lines 11 and 12. The third position (3) is where the entire receiving transmission line 21 is located on the sending transmission line 12.

When the receiving transmission line 21 is at the second position (2), the first and third output ends 21*a* and 21*c* are located on the sending transmission line 12, and the second and fourth output ends 21*b* and 21*d* are located on the sending transmission line 11.

When the receiving transmission line 21 is at the first position (1) illustrated in FIG. 2, the differential outputs from the first and third output ends 21*a* and 21*c* of the receiving transmission line 21 are the output of a coupled end. The differential outputs from the second and fourth output ends 21*b* and 21*d* of the receiving transmission line 21 are the output of an isolation end.

At the first position (1), as illustrated in FIG. 3A, the difference signal COUT between the differential combined signals output from the combiners 22 and 23 is small since the signal component of the isolation end and the signal component of the coupled end are combined to cancel each other. The output signal of the isolation end has a small signal width (pulse width) with a lot of high frequency components. Such frequency components can be reduced by a low-pass filter. The difference signal FOUT resulting from filtering of the differential filter 24 is thus a signal with smooth peaks.

In the subsequent demodulation processing, the rising and falling edges of the filtered difference signal FOUT are detected by the comparator 25, so that the original transmission signal (input signal IN1) is demodulated as the output signal ComOUT.

When the receiving transmission line 21 is at the third position (3) illustrated in FIG. 2, conversely to the case of the first position (1), the differential outputs from the second and fourth output ends 21*b* and 21*d* of the receiving transmission line 21 are the output of a coupled end. The differential outputs from the first and third output ends 21*a* and 21*c* of the receiving transmission line 21 are the output of an isolation end.

More specifically, at the third position (3), as illustrated in FIG. 3C, the difference signal OUT1 is similar to the difference signal OUT2 of FIG. 3A, and the difference signal OUT2 is similar to the difference signal OUT1 of FIG. 3A. That is, the difference signals OUT1 and OUT2 are reverse to those at the first position (1), whereas the combined difference signal COUT is the same. The difference signal COUT is filtered by the differential filter 24, and the rising and falling edges of the filtered difference signal FOUT are detected by the comparator 25. The original transmission signal (input signal IN1) is thereby demodulated as the output signal ComOUT.

When the receiving transmission line 21 is at the second position (2) illustrated in FIG. 2, the first and third output ends 21*a* and 21*c* of the receiving transmission line 21 serve as a coupled end to the sending transmission line 11, and an isolation end to the sending transmission line 12. Meanwhile, the second and fourth ends 21*b* and 21*d* of the receiving transmission line 21 serve as a coupled end to the sending transmission line 12, and an isolation end to the sending transmission line 11.

In other words, at the second position (2), as illustrated in FIG. 3B, the difference signals OUT1 and OUT2 are both combined signals of the signal component of a coupled end and the signal component of an isolation end. In such a case, the difference signals OUT1 and OUT2 have a short pulse width and large ripples as compared with the output signals of ordinary coupled ends. The output signals are filtered by the differential filter 24. The resulting difference signal FOUT thus has a pulse width smaller than that of the difference signal FOUT in FIGS. 3A and 3C, with reduced ripples. The rising and falling edges of the difference signal FOUT from the differential filter 24 are detected by the comparator 25. The original transmission signal (input signal IN1) is thereby normally demodulated as the output signal ComOUT even when the receiving transmission line 21 moves over the feeding points of the sending transmission lines 11 and 12.

[Second Configuration Example]

Next, a second configuration example of the wireless communication system according to the first exemplary embodiment will be described.

Figure 4:
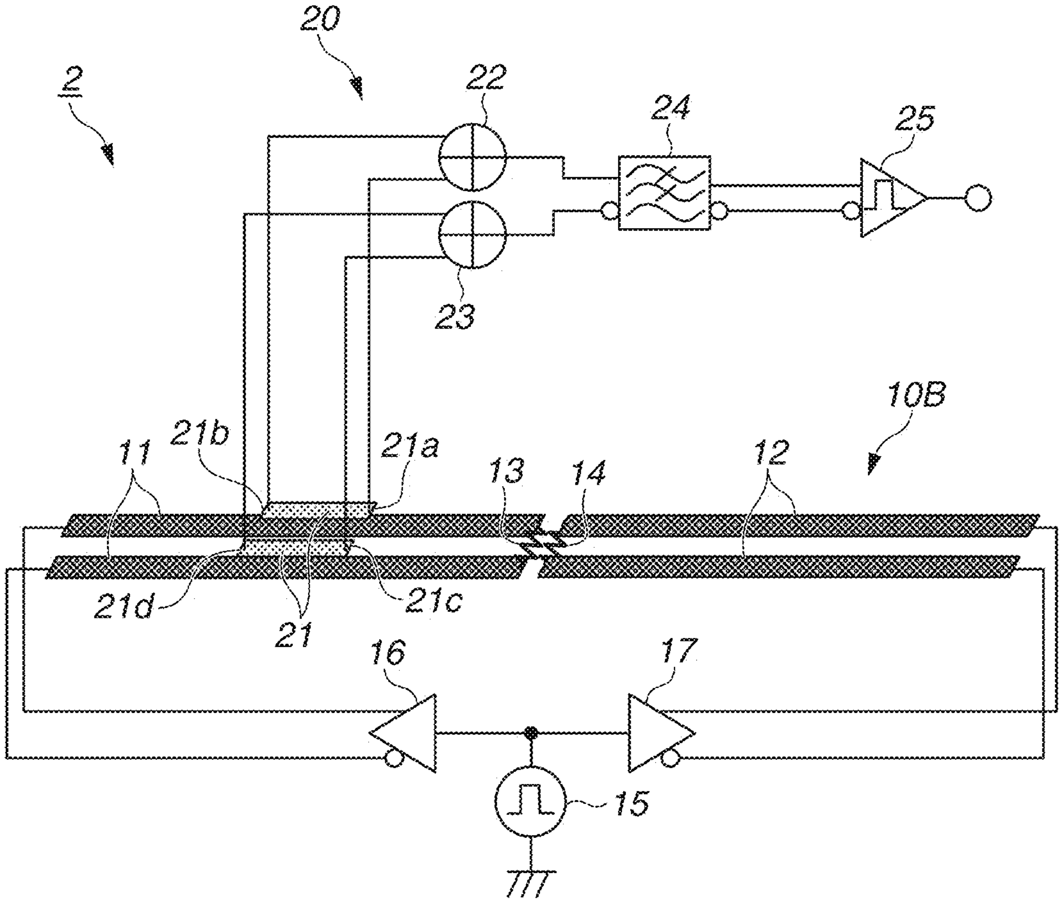
FIG. 4 is a diagram illustrating a second configuration example of the wireless communication system according to one or more aspects of the present disclosure.

FIG. 4 is a diagram illustrating the second configuration example of the wireless communication system according to the first exemplary embodiment.

As illustrated in FIG. 4, a wireless communication system 2 according to the second configuration example includes a transmission apparatus 10B and the reception apparatus 20.

The transmission apparatus 10B is configured by reversing the orientation of the sending transmission lines 11 and 12 in the transmission apparatus 10A of the foregoing first configuration example, so that the termination points are located near and opposed to each other. In other respects, the second configuration example is similar to the foregoing first configuration example, including the reception apparatus 20.

Figure 5:
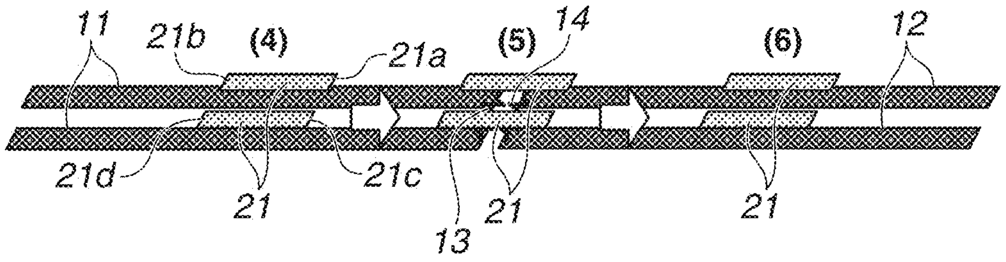
FIG. 5 is a diagram illustrating a transition example of the movement positions of the receiving transmission lines of FIG. 4.
Figures 6A, 6B, 6C:
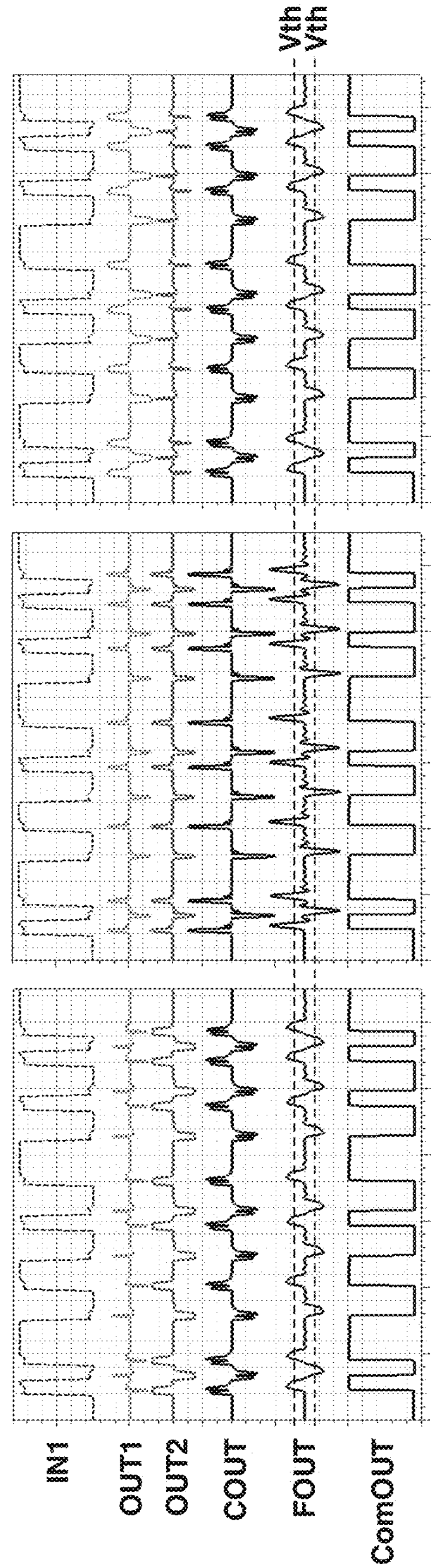
FIGS. 6A to 6C are timing charts of signals of various components at respective movement positions of FIG. 5.

FIG. 5 is a diagram illustrating a transition example of the movement position of the receiving transmission line 21 of the wireless communication system 2 according to the second configuration example. FIGS. 6A, 6B, and 6C are timing charts of the signals of various components at respective movement positions (4), (5), and (6) of FIG. 5.

In FIGS. 6A to 6C, the horizontal axis indicates time, and the vertical axis indicates voltage. In FIGS. 6A to 6C, the signals output from the respective components, which originally are differential signals, are illustrated as difference signals for the convenience of description. The signals are of components similar to those in the foregoing first configuration example.

As illustrated in FIG. 5, the receiving transmission line 21 transitions to each of fourth, fifth, and sixth positions (4), (5), and (6) denoted by (4), (5), and (6) in the diagram with respect to the sending transmission lines 11 and 12 through straightforward movement.

The fourth position (4) is where the entire receiving transmission line 21 is located on the sending transmission line 11. The fifth position (5) is where the receiving transmission line 21 lies over the termination points of the sending transmission lines 11 and 12. The sixth position (6) is where the entire receiving transmission line 21 is located on the sending transmission line 12.

When the receiving transmission lines 21 are at the fifth position (5), the first and third output ends 21*a* and 21*c* are located on the sending transmission lines 12. The second and fourth output ends 21*b* and 21*d* are located on the sending transmission lines 11.

When the receiving transmission lines 21 is at the fourth position (4) illustrated in FIG. 5, the differential outputs from the second and fourth output ends 21*b* and 21*d* of the receiving transmission line 21 are the output of a coupled end. Meanwhile, the difference outputs from the first and third output ends 21*a* and 21*c* of the receiving transmission line 21 are the output of an isolation end.

At the fourth position (4), as illustrated in FIG. 6A, the difference signal COUT between the differential combined signals output from the combiners 22 and 23 is small since the signal component of the isolation end and the signal component of the coupled end are combined to cancel each other. The output signal of the isolation end has a small signal width with a lot of high frequency components. The high frequency components can be reduced by a low-pass filter. The difference signal FOUT filtered by the differential filter 24 is thus a signal with smooth peaks. The rising and falling edges of the filtered difference signal FOUT are detected by the comparator 25, whereby the original transmission signal (input signal IN1) is demodulated as the output signal ComOUT.

When the receiving transmission line 21 is at the sixth position (6) illustrated in FIG. 5, conversely to the case of the fourth position (4), the differential outputs from the first and third output ends 21*a* and 21*c* of the receiving transmission line 21 are the output of a coupled end. Meanwhile, the difference outputs from the second and fourth output ends 21*b* and 21*d* of the receiving transmission line 21 are the output of an isolation end.

At the sixth position (6), as illustrated in FIG. 6C, the difference signals OUT1 and OUT2 are reverse to those at the fourth position (4). However, the difference signal COUT between the differential combined signals output from the combiners 22 and 23 is similar to the difference signal COUT of FIG. 6A. The rising and falling edges of the difference signal are detected by the comparator 25, so that the original transmission signal (input signal IN1) is demodulated as the output signal ComOUT.

When the receiving transmission line 21 is at the fifth position (5) illustrated in FIG. 5, the second and fourth output ends 21*b* and 21*d* of the receiving transmission line 21 are located on the sending transmission line 11, and serve as a coupled end to the sending transmission line 11 and an isolation end to the sending transmission line 12. Meanwhile, the first and third output ends 21*a* and 21*c* of the receiving transmission line 21 are located on the sending transmission line 12, and serve as a coupled end to the sending transmission line 12 and an isolation end to the sending transmission line 11.

In other words, at the fifth position (5), as illustrated in FIG. 6B, the difference signals OUT1 and OUT2 are both combined signals of the signal component of a coupled end and the signal component of an isolation end. In such a case, the difference signals OUT1 and OUT2 are output signals with a short pulse width and large ripples before signal rises, as compared with the output signals of ordinary coupled ends. The output signals are filtered by the differential filter 24. The filtered difference signal FOUT has a pulse width smaller than that of the difference signal FOUT in FIGS. 6A and 6C, with reduced ripples. The rising and falling edges of the difference signal FOUT are detected by the comparator 25. The original transmission signal (input signal IN1) is thereby normally demodulated as the output signal ComOUT even when the receiving transmission line 21 moves over the termination points of the sending transmission lines 11 and 12.

In the foregoing first and second configuration examples, FIGS. 3A to 3C and 6A to 6C illustrate examples where a signal (IN1) having a communication speed of 500 [Mbps] is demodulated. The output signal FOUT of the differential filter 24 has a signal width of 0.9 [ns] or more. Expensive comparators with a small minimum pulse width therefore do not need to be used.

Suppose that the ripples and noise level of the difference signal COUT between the combined signals are sufficiently lower than the level of the difference signal COUT between the combined signals in FIGS. 3A and 3C and FIGS. 6A and 6C. In such a case, the differential filter 24 may be omitted from the reception apparatus 20 by adjusting the threshold of the comparator 25 to exceed the ripples and noise level of the difference signal COUT between the combined signals.

[Third Configuration Example]

Next, a third configuration example of the wireless communication system according to the first exemplary embodiment will be described.

Figure 7:
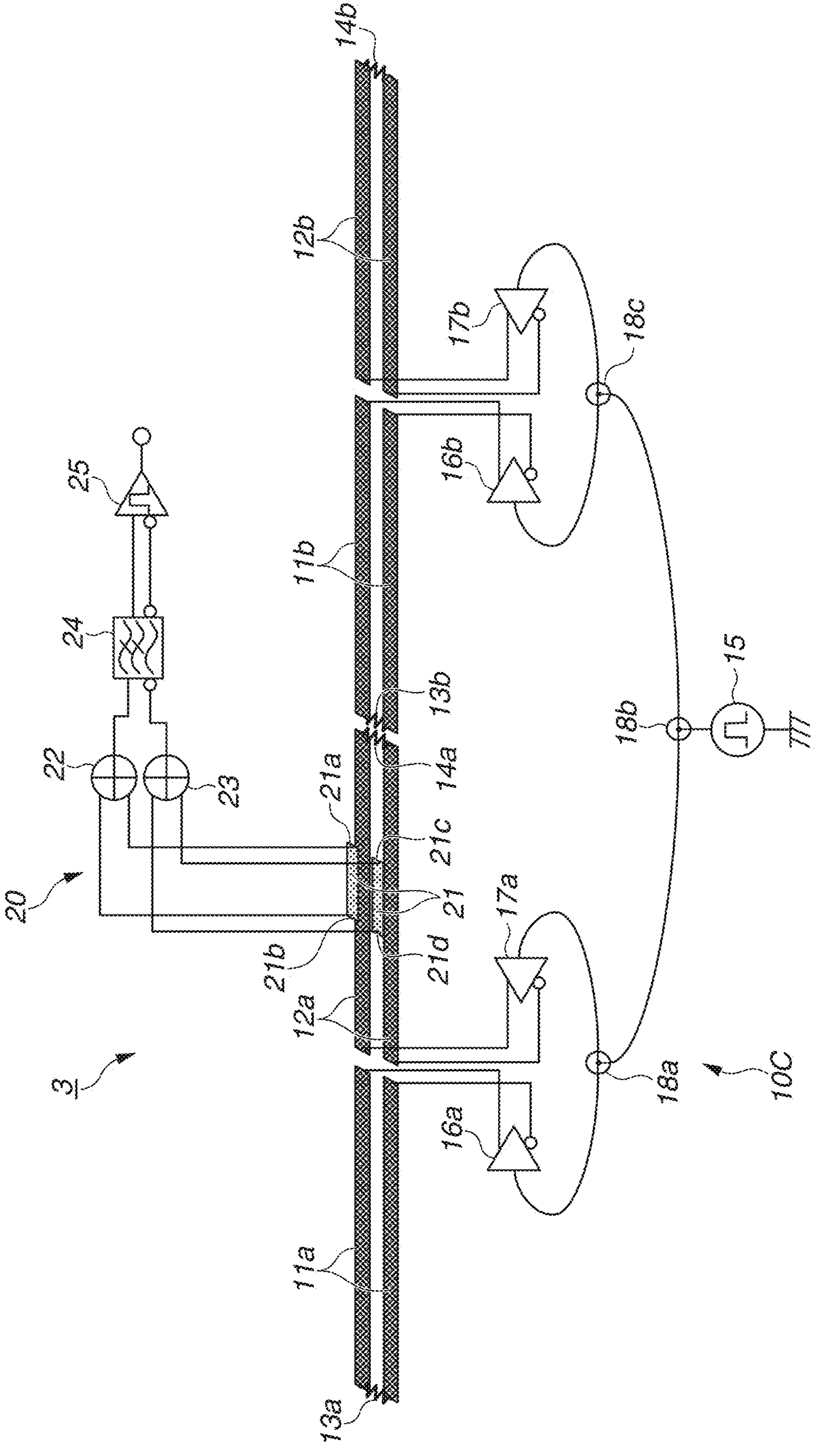
FIG. 7 is a diagram illustrating a third configuration example of the wireless communication system according to one or more aspects of the present disclosure.

FIG. 7 is a diagram illustrating the third configuration example of the wireless communication system according to the first exemplary embodiment.

As illustrated in FIG. 7, a wireless communication system 3 according to the third configuration example includes a transmission apparatus 10C and the reception apparatus 20.

The transmission apparatus 10C includes sending transmission lines 11*a* and 12*a*, sending transmission lines 11*b* and 12*b*, termination resistors 13*a* and 14*a*, and termination resistors 13*b* and 14*b*. The transmission apparatus 10C further includes a signal source 15, differential transmission buffers 16*a* and 17*a*, differential transmission buffers 16*b* and 17*b*, and dividers 18*a*, 18*b*, and 18*c*.

The sending transmission lines 11*a* and 12*a* and the sending transmission lines 11*b* and 12*b* both have a configuration similar to that of the sending transmission lines 11 and 12 of the foregoing first configuration example. The differential transmission buffers 16*a* and 17*a* and the differential transmission buffers 16*b* and 17*b* both have a configuration similar to that of the differential transmission buffers 16 and 17 of the foregoing first configuration example.

The sending transmission lines 11*a* and 12*a* are arranged so that their feeding points are located near and opposed to each other. The other end of the sending transmission line 11*a* is terminated by the termination resistor 13*a*. The other end of the sending transmission line 12*a* is terminated by the termination resistor 14*a*.

The sending transmission lines 11*b* and 12*b* are arranged so that their feeding points are located near and opposed to each other. The other end of the sending transmission line 11*b* is terminated by the termination resistor 13*b*. The other end of the sending transmission line 12*b* is terminated by the termination resistor 14*b*.

The sending transmission lines 11*a* and 12*a* and the sending transmission lines 11*b* and 12*b* are arranged so that the termination point of the sending transmission line 12*a* and the termination point of the sending transmission line 11*b* are located near and opposed to each other.

Thus, there are apparently three sets of sending transmission lines, two sets of sending transmission lines with the feeding points opposed to each other and one set of sending transmission lines with the termination points opposed to each other.

A data transmission signal (radio frequency signal) from the signal source 15 is initially divided into two by the divider 18*a*. One of the divided signals is further divided into two by the divider 18*b* and input to the feeding points of the sending transmission lines 11*a* and 12*a*. The other is further divided into two by the divider 18*c* and input to the feeding points of the sending transmission lines 11*b* and 12*b*. Using the dividers 18*a* to 18*c*, equal-length wiring is laid so that the delay times from the signal source 15 to the respective differential transmission buffers 16*a*, 17*a*, 16*b*, and 17*b* are substantially the same. Examples of the dividers 18*a* to 18*c* may include resistive dividers and Wilkinson dividers.

The transmission apparatus 10*c* is disposed on a stationary structure (not illustrated), for example. The reception apparatus 20 is disposed on a straight-forward movement structure (not illustrated), for example. The reception apparatus 20 is configured so that the receiving transmission line 21 can reciprocate over and along the sending transmission lines 11*a* and 12*a* and the sending transmission lines 11*b* and 12*b* at a distance in which electromagnetic field coupling is realizable.

The operation when the receiving transmission line 21 moves over the sending transmission lines 11*a* and 12*a* and over the sending transmission lines 11*b* and 12*b* is similar to that in the foregoing first configuration example (see FIGS. 2 and 3A to 3C). The operation when the receiving transmission line 21 moves over the sending transmission lines 12*a* and 11*b* is similar to that in the foregoing second configuration example (see FIGS. 5 and 6A to 6C).

As in the foregoing first and second configuration examples, the original transmission signal (input signal IN1) can thus be normally demodulated even when the receiving transmission line 21 moves over two opposed feeding points or over the two opposed termination points.

Again, in the third configuration example, if the ripples and noise levels of the output signals of the combiners 22 and 23 are sufficiently low, the differential filter 24 can be omitted from the reception apparatus 20 by adjusting the threshold of the comparator 25 to exceed the ripples and noise levels of the output signals.

In the foregoing first to third configuration examples, the differential filter 24 is interposed between the combiners 22 and 23 and the comparator 25. However, the differential filter 24 may be interposed between the receiving transmission line 21 and the combiners 22 and 23. Alternatively, the differential filter 24 may be interposed between the signal source 15 and the sending transmission lines 11 and 12. In such a case, the differential filter 24 may be interposed between the signal source 15 and the differential transmission buffers 16 and 17, or between the differential transmission buffers 16 and 17 and the sending transmission lines 11 and 12. The ripple component of the transmission signal can thereby be reduced, and consequently the signal component (ripple component) at the isolation end of the receiving transmission line 21 can be reduced.

As described above, in the wireless communication systems 1 to 3 according to the first exemplary embodiment, the transmission apparatuses 10A to 10C input the signal from the signal source 15 to the respective signal feeding points of at least two sending transmission lines arranged so that at least either the feeding points of the signal or the termination points are opposed to each other. The reception apparatus 20 moves the receiving transmission line 21 along the sending transmission lines, establishes electromagnetic field coupling with the sending transmission lines, and receives excited signals. The combiners 22 and 23 receive the signals from both one output end (first and third output ends 21*a* and 21*c*) and the other output end (second and fourth output ends 21*b* and 21*d*) of the receiving transmission line 21. The two pairs of differential signals received are combined by the respective combiners 22 and 23, and the combined signals are filtered by the differential filter 24 (low-pass filter). The filtered combined signals are then output to the comparator 25 as signals to be subjected to the demodulation processing.

Such a configuration enables a reception signal to be stably obtained that is usable for the demodulation processing even when the receiving transmission line 21 moves over two opposed feeding points or two opposed termination points of the sending transmission lines.

Next, a second exemplary embodiment of the present disclosure will be described. FIGS. 8 and 9A to 9D are diagrams illustrating the second exemplary embodiment.

The second exemplary embodiment differs from the foregoing first exemplary embodiment in that two sending transmission lines are arranged in an annular shape so that their feeding points, as well as termination points, are located near and opposed to each other.

Differences from the foregoing first exemplary embodiment will be described in detail below. Descriptions of redundant portions will be omitted as appropriate.

Figure 8:
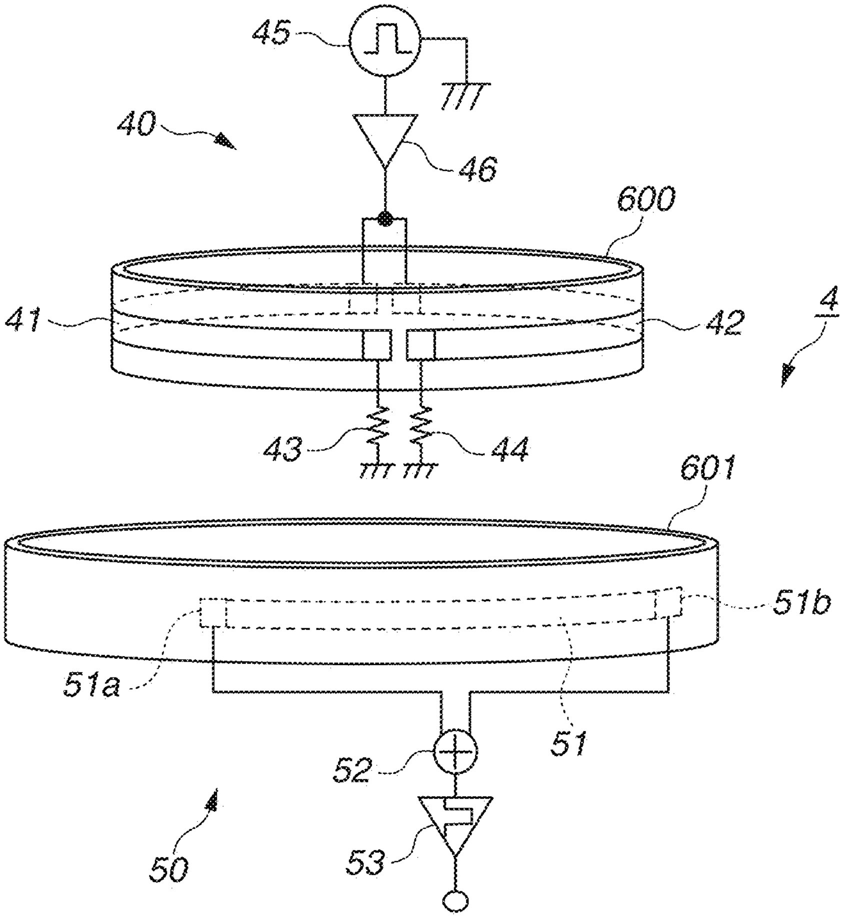
FIG. 8 is a schematic diagram illustrating a configuration example of a wireless communication system according to one or more aspects of the present disclosure.

FIG. 8 is a schematic diagram illustrating a configuration example of a wireless communication system according to the second exemplary embodiment.

As illustrated in FIG. 8, a wireless communication system 4 according to the second exemplary embodiment includes a transmission apparatus 40 and a reception apparatus 50.

The transmission apparatus 40 includes sending transmission lines 41 and 42, termination resistors 43 and 44, a signal source 45, and a transmission buffer 46.

The sending transmission lines 41 and 42 are constituted by single-ended transmission lines of equal lengths. The sending transmission lines 41 and 42 are not limited to the single-ended configuration and may be constituted by differential lines.

One end of each of the sending transmission lines 41 and 42 serves as a feeding point to which a signal is input, and is electrically connected to the output terminal of the transmission buffer 46. The termination resistors 43 and 44 that are substantially equivalent to the characteristic impedance of the sending transmission lines 41 and 42 are electrically connected to the other ends of the sending transmission lines 41 and 42 to form termination points.

The transmission apparatus 40 is disposed on an annular stationary structure 600. The sending transmission lines 41 and 42 are arranged in a substantially annular shape circumferentially along the outer periphery of the stationary structure 600.

Specifically, the sending transmission lines 41 and 42 are both shaped to curve along the outer periphery and arranged so that their feeding points are circumferentially located near and opposed to each other, and their termination points are circumferentially located near and opposed to each other.

The output terminal of the signal source 45 is electrically connected to the input terminal of the transmission buffer 46. The output terminal of the transmission buffer 46 is electrically connected to the respective feeding points of the sending transmission lines 41 and 42.

The signal source 45 outputs a signal (transmission data signal) corresponding to transmission data. The transmission buffer 46 amplifies the transmission data signal input from the signal source 45, and inputs the amplified signal to the respective feeding points of the sending transmission lines 41 and 42.

The reception apparatus 50 includes a receiving transmission line 51, a combiner 52, and a comparator 53.

The receiving transmission line 51 is constituted by a single-ended transmission line, and configured to be shorter than the sending transmission lines 41 and 42. A first output end 51*a* that is one end of the receiving transmission line 51 is electrically connected to one of the two input terminals of the combiner 52. A second output end 51*b* that is the other end of the receiving transmission line 51 is electrically connected to the other input terminal of the combiner 52. The output terminal of the combiner 52 is electrically connected to the input terminal of the comparator 53.

The reception apparatus 50 is disposed on an annular structure 601 to be driven to rotate (hereinafter, referred to as a "rotating structure 601"). The receiving transmission line 51 is located circumferentially along the inner periphery of the rotating structure 601. Specifically, the receiving transmission line 51 is shaped to curve along the inner periphery.

In FIG. 8, the stationary structure 600 and the rotating structure 601 are separately illustrated to clearly indicate the arrangement of the sending transmission lines 41 and 42 and the receiving transmission line 51. In practice, the stationary structure 600 is concentrically located inside the rotating structure 601. The outer diameter of the stationary structure 600 and the inner diameter of the rotating structure 601 are configured so that when the structures are concentrically located, the receiving transmission line 51 can move over and along the sending transmission lines 41 and 42 in a non-contact manner at an opposing distance in which electromagnetic field coupling is realizable.

The combiner 52 combines signals input from the first and second output ends 51*a* and 51*b* of the receiving transmission line 51, and outputs the combined signal to the comparator 53. The combiner 52 is matched with input impedance substantially the same as the characteristic impedance of the receiving transmission line 51.

The comparator 53 detects the rising and falling edges of the input combined signal. The comparator 53 has hysteresis such that "1" is output when the detected edge signal reaches or exceeds a threshold voltage Vth, and "0" is output when the detected edge signal falls to or below a threshold voltage-Vth.

FIGS. 9A, 9B, 9C, and 9D are diagrams illustrating a transition example of the movement position of the receiving transmission line 51 of FIG. 8.

As illustrated in FIGS. 9A to 9D, in the wireless communication system 4, the receiving transmission line 51 rotates over and along the sending transmission lines 41 and 42 clockwise.

While in the example illustrated in FIGS. 9A to 9D the receiving transmission line 51 is configured to rotate clockwise, other operation patterns and operation ranges may be employed. For example, the receiving transmission line 51 may be configured to rotate counterclockwise, or alternate clockwise and counterclockwise movements.

The configuration may be reversed, specifically, the receiving transmission line 51 may be disposed on the stationary structure 600 and the sending transmission lines 41 and 42 on the rotating structure 601 because it is sufficient for the receiving transmission line 51 to be moved over and along the sending transmission lines 41 and 42.

Figure 9A:
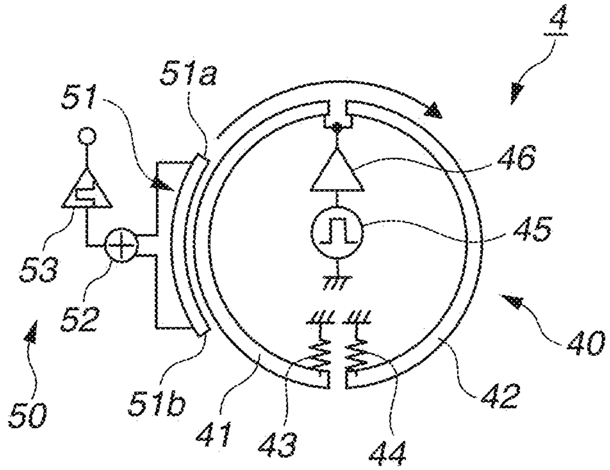
FIGS. 9A to 9D are diagrams illustrating a transition example of the movement positions of receiving transmission lines of FIG. 8.
Figure 9B:
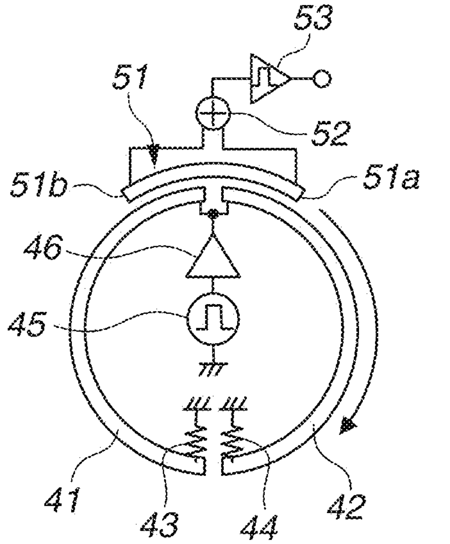
Figure 9C:
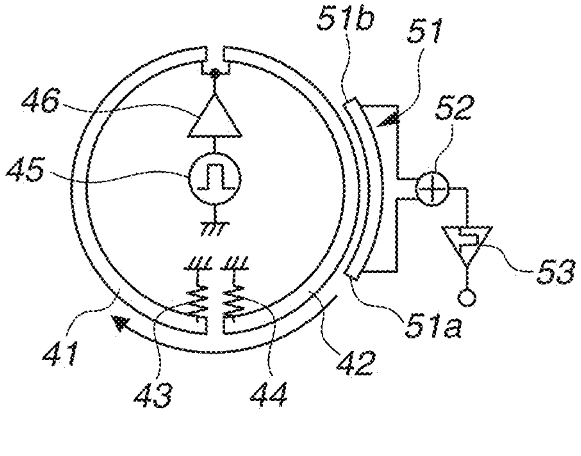

When the receiving transmission line 51 moves from the position of FIG. 9A to the position of FIG. 9C via the position of FIG. 9B, a principle similar to that of the first configuration example of the foregoing first exemplary embodiment applies. Specifically, at the movement position illustrated in FIG. 9B, the output signals from the first and second output ends 51*a* and 51*b* of the receiving transmission line 51 are both combined signals of the signal component of a coupled end and the signal component of an isolation end. In such a case, the combined signal of these output signals is an output signal with a short pulse width and large ripples as compared with an output signal from an ordinary coupled end. The comparator 53 detects the rising and falling edges of the combined signal, so that the original transmission signal is normally demodulated as the output signal of the comparator 53 even when the receiving transmission line 51 moves over the feeding points of the sending transmission lines 41 and 42.

Figure 9D:
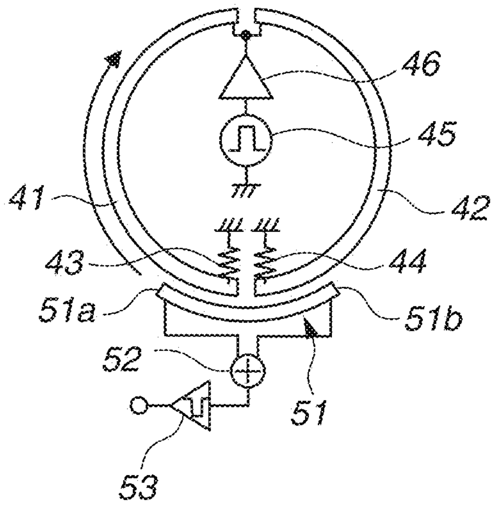

When the receiving transmission line 51 moves from the position of FIG. 9C to the position of FIG. 9A via the position of FIG. 9D, a principle similar to that of the second configuration example of the foregoing first exemplary embodiment applies. Specifically, at the movement position illustrated in FIG. 9D, the output signals from the first and second ends 51*a* and 51*b* are both combined signals of the signal component of a coupled end and the signal component of an isolation end. In such a case, the combined signal of these output signals is an output signal with a short pulse width and large ripples as compared with an output signal from an ordinary coupled end, but can be sufficiently used for demodulation processing.

The rising and falling edges of the combined signal are detected by the comparator 53, so that the original transmission signal is normally demodulated as the output signal of the comparator 53 even when the receiving transmission line 51 moves over the termination points of the sending transmission lines 41 and 42.

The wireless communication system 4 illustrated in FIGS. 8 and 9A to 9D does not include a filter for reducing the signal component of an isolation end (e.g., a low-pass filter) at the output stage of the combiner 52. However, the wireless communication system 4 may include such a filter.

As described above, in the wireless communication system 4 according to the second exemplary embodiment, the transmission apparatus 40 inputs signals from the signal source 45 to the respective feeding points of the sending transmission lines 41 and 42 that are arranged in an annular shape so that the feeding points of the signal and the termination points are opposed to each other. The reception apparatus 50 moves the receiving transmission line 51 along the sending transmission lines 41 and 42, establishes electromagnetic field coupling with the sending transmission lines 41 and 42, and receives excited signals. The combiner 52 receives the signals from both the first and second output ends 51*a* and 51*b* of the receiving transmission line 51, and combines the received two signals. The combined signal is then output to the comparator 53 as a signal to be subjected to the demodulation processing.

Such a configuration enables a reception signal usable for the demodulation processing to be be stably obtained even in a case where the receiving transmission line 51 moves over the opposed two feeding points or two termination points of the two sending transmission lines 41 and 42.

Next, a third exemplary embodiment of the present disclosure will be described. FIGS. 10A to 10D are diagrams illustrating the third exemplary embodiment.

The third exemplary embodiment includes two changeover switches instead of a combiner. The third exemplary embodiment differs from the foregoing first and second exemplary embodiments in that the connections of the first and second output ends of the receiving transmission line are switched between the comparator and a termination resistor by controlling the switching operation of the two changeover switches.

Differences from the foregoing first and second exemplary embodiments will be described in detail below. Descriptions of redundant portions will be omitted as appropriate.

FIGS. 10A, 10B, 10C, and 10D are schematic diagrams illustrating a configuration example of a wireless communication system 5 according to the third exemplary embodiment and a transition example of the movement position of the receiving transmission line.

As illustrated in FIGS. 10A to 10D, the wireless communication system 5 includes a transmission apparatus 40 and a reception apparatus 60.

The reception apparatus 60 includes a receiving transmission line 61, changeover switches 62 and 63, a comparator 64, and a termination resistor 65.

The transmission apparatus 40 is disposed on a stationary structure 600 as in the foregoing second exemplary embodiment. The reception apparatus 60 is disposed on a rotating structure 601 as in the foregoing second exemplary embodiment.

The receiving transmission line 61 is constituted by a single-ended transmission line and configured to be shorter than sending transmission lines 41 and 42. A first output end 61*a* that is one end of the receiving transmission line 61 is electrically connected to one of the two input terminals of each of the changeover switches 62 and 63. A second output end 61*b* that is the other end of the receiving transmission line 61 is electrically connected to the other of the two input terminals of each of the changeover switches 62 and 63.

The output terminal of the changeover switch 62 is electrically connected to the input terminal of the comparator 53. The output terminal of the changeover switch 63 is electrically connected to the termination resistor 65.

Although omitted in FIGS. 10A to 10D, a control circuit for controlling switching is connected to the changeover switches 62 ad 63.

This control circuit controls the switching of the changeover switches 62 and 63 so that one of the first and second output ends 61*a* and 61*b* of the receiving transmission line 61 where the time length (signal width) of the output signal is greater is connected to the comparator 64, and one where the signal width is smaller is connected to the termination resistor 65.

In other words, the changeover switches 62 and 63 are controlled by the control circuit to operate in an interlocking manner so that one of the output ends of the receiving transmission line 61 is electrically connected to the comparator 64 while the other is terminated.

For example, the control method includes detecting the signal widths of the output signals from the first and second output ends 61*a* and 61*b* of the receiving transmission line 61, comparing the magnitudes (time lengths) of the detected signal widths, and switching the connections based on the comparison result.

Alternatively, if a relationship between the movement position of the receiving transmission line 61 and the signal widths of the output signals from the first and second output ends 61*a* and 61*b* is known in advance, the movement position of the receiving transmission line 61 may be detected and the connections may be switched based on the movement position.

In either of the foregoing control methods, one of the output ends where the signal width is greater is basically connected to the comparator 64, and the other output end to the termination resistor 65.

Figure 10A:
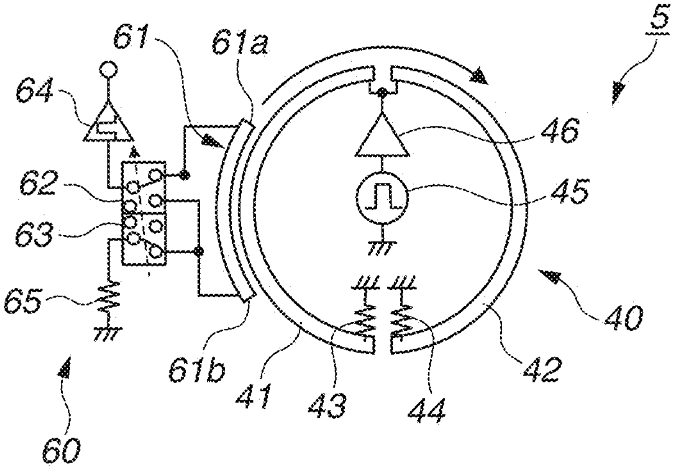
FIGS. 10A to 10D are schematic diagrams illustrating a configuration example of a wireless communication system according to one or more aspects of the present disclosure.
Figure 10B:
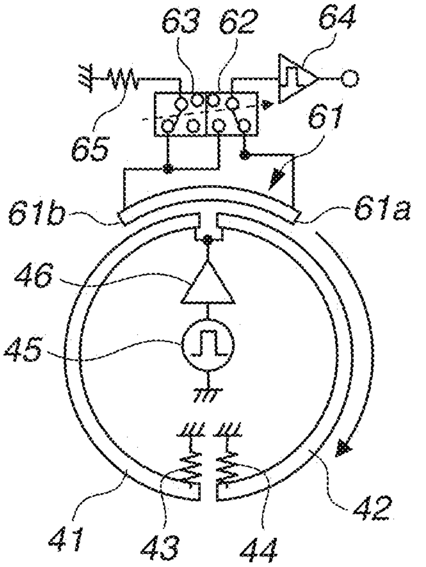
Figure 10C:
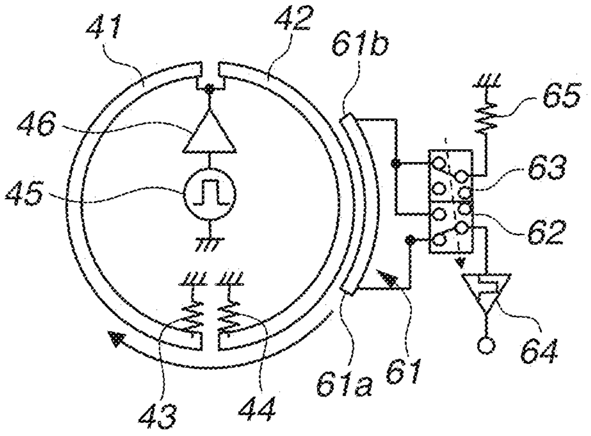
Figure 10D:
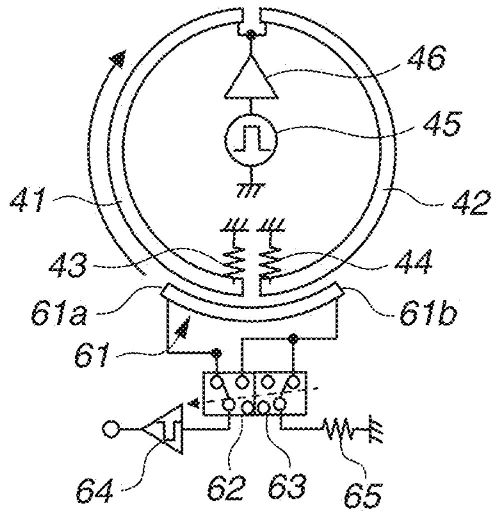

However, at the movement positions illustrated in FIGS. 10B and 10D, the output signals from the first and second output ends 61*a* and 61*b* have substantially the same signal widths. If the control method for switching the changeover switches 62 and 63 depending on the movement position is employed, which of the first and second output ends 61*a* and 61*b* to connect to the comparator 64 and which to connect to the termination resistor 65 are therefore determined in advance.

The control circuit may be constituted by only hardwired circuits, or further include a processor and be configured to control the switching operation of the changeover switches 62 and 63 based on a control program executed by the processor.

Next, an operation of the third exemplary embodiment will be described based on FIGS. 10A to 10D and with reference to FIGS. 3A to 3C and 6A to 6C. The signals obtained in the first and second configuration examples of the foregoing first exemplary embodiment (see FIGS. 3A to 3C and 6A to 6C) and those obtained in the configuration example illustrated in FIGS. 10A to 10D are slightly different but have substantially the same characteristics. The following description will thus be provided with reference to the foregoing signals.

In the following description, the control circuit includes a sensor for detecting a rotation angle, and detect the movement position of the receiving transmission line 61 (rotational position of the rotating structure 601) based on the detection value of the sensor. The changeover switches 62 and 63 are switched based on the detected position information and a switching rule defined in conjunction with the movement position in advance. The switching rule is defined so that at the movement position illustrated in FIG. 10B where the output signals from the first and second output ends 61*a* and 61*b* have substantially the same signal widths, the second output end 61*b* is connected to the comparator 64 and the first output end 61*a* is connected to the termination resistor 65. Similarly, the switching rule is defined so that at the movement position illustrated in FIG. 10D, the first output end 61*a* is connected to the comparator 64 and the second output end 61*b* is connected to the termination resistor 65.

Initially, at the movement position illustrated in FIG. 10A, the first output end 61*a* of the receiving transmission line 61 serves as a coupled end, and the second output end 61*b* serves as an isolation end. In other words, the output signal from the first output end 61*a* has a signal width greater than that of the output signal from the second output end 61*b* (see FIG. 3A).

In such a case, the control circuit controls the changeover switches 62 and 63 so that the first output end 61*a* serving as a coupled end is connected to the comparator 64, and the second output end 61*b* serving as an isolation end is connected to the termination resistor 65. Terminating the second output end 61*b* can reduce the effect of reflected waves on the output signal of the first output end 61*a*. The original transmission signal is demodulated by the comparator 64 detecting the rising and falling edges of the output signal output from the first output end 61*a*.

Next, suppose that the receiving transmission line 61 moves in the direction of the arrow in FIG. 10A from the movement position illustrated in FIG. 10A to the movement position illustrated in FIG. 10B. At the movement position illustrated in FIG. 10B, the first output end 61*a* of the receiving transmission line 61 is located on the sending transmission line 41, and the second output end 61*b* is located on the sending transmission line 42.

In such a case, the output signals from the first and second output ends 61*a* and 61*b* are both combined signals of the signal component of a coupled end and the signal component of an isolation end.

The output signals both have a signal width approximately one half that of the output signal from the coupled end at the movement position of FIG. 10A (see FIG. 3B).

In such a case, the control circuit controls the changeover switches 62 and 63 based on the predetermined rule so that the second output end 61*b* is connected to the comparator 64 and the first output end 61*a* serving as an isolation end is connected to the termination resistor 65. Such a rule takes into account the fact that the signal component of the coupled end, or the signal component of the output signal from the second output end 61*b*, increases as the receiving transmission line 61 moves clockwise from the movement position illustrated in FIG. 10B.

The original transmission signal is demodulated by the comparator 64 detecting the rising and falling edges of the output signal output from the second output end 61*b*.

Suppose that the receiving transmission line 61 continues to move in the direction of the arrow in FIG. 10B from the movement position illustrated in FIG. 10B to the movement position illustrated in FIG. 10C. At the movement position illustrated in FIG. 10C, the first output end 61*a* of the receiving transmission line 61 serves as an isolation end, and the second output end 61*b* a coupled end. In other words, the output signal from the second output end 61*b* has a signal width greater than that of the output signal from the first output end 61*a* (see FIG. 3C).

Here, maintaining the connection configuration switched at the movement position illustrated in FIG. 10B is sufficient, so that the changeover switches 62 and 63 are not switched and the connection configuration is maintained.

The original transmission signal is demodulated by the comparator 64 detecting the rising and falling edges of the output signal output from the second output end 61*b*.

Suppose that the receiving transmission line 61 continues to move in the direction of the arrow in FIG. 10C from the movement position illustrated in FIG. 10C to the movement position illustrated in FIG. 10D. At the movement position illustrated in FIG. 10D, the first output end 61*a* of the receiving transmission line 61 is located on the sending transmission line 42, and the second output end 61*b* is located on the sending transmission line 41.

In such a case, the output signals from the first and second output ends 61*a* and 61*b* are both combined signals of the signal component of a coupled end and the signal component of an isolation end.

The output signals both have a signal width approximately one half that of the output signal from the coupled end at the movement position of FIG. 10C (see FIG. 6B).

In such a case, the control circuit controls the changeover switches 62 and 63 based on the predetermined rule so that the first output end 61*a* is connected to the comparator 64, and the second output end 61*b* serving as an isolation end is connected to the termination resistor 65. Again, as at the movement position illustrated in FIG. 10B, the rule takes into account the fact that the signal component of the coupled end, or the signal component of the output signal from the first output end 61*a*, increases as the receiving transmission line 61 moves clockwise from the movement position illustrated in FIG. 10D.

The original transmission signal is demodulated by the comparator 64 detecting the rising and falling edges of the output signal output from the first output end 61*a*.

As described above, in the wireless communication system 5 according to the third exemplary embodiment, the transmission apparatus 40 inputs the signal from the signal source 45 to the respective feeding points of the sending transmission lines 41 and 42 arranged in an annular shape so that the feeding points of the signal and the termination points are opposed to each other. The reception apparatus 60 moves the receiving transmission line 61 along the sending transmission lines 41 and 42, establishes electromagnetic field coupling with the sending transmission lines 41 and 42, and receives excited signals. Moreover, the control circuit controls the switching operation of the changeover switches 62 and 63. Specifically, the changeover switches 62 and 63 are controlled so that one of the first and second output ends 61*a* and 61*b* of the receiving transmission line 61 where the signal width of the output signal is greater is connected to the comparator 64, and the other is connected to the termination resistor 65.

With such a configuration, a reception signal usable for the demodulation processing can be stably obtained even when the receiving transmission line 61 moves over the opposed two feeding points or two termination points of the sending transmission lines 41 and 42.

Moreover, in the third exemplary embodiment, the changeover switches 62 and 63 are controlled depending on the movement position of the receiving transmission line 61 so that when the receiving transmission line 61 reaches the movement position illustrated in FIG. 10B, the second output end 61*b* is connected to the comparator 64 and the first output end 61*a* is connected to the termination resistor 65. Moreover, when the receiving transmission line 61 reaches the movement position illustrated in FIG. 10D, the first output end 61*a* is connected to the comparator 64 and the second output end 61*b* is connected to the termination resistor 65.

Such a configuration enables continuous communication even if the receiving transmission line 61 moves to go around the sending transmission lines 41 and 42.

Next, a fourth exemplary embodiment of the present disclosure will be described. FIGS. 11A to 14D are diagrams illustrating the fourth exemplary embodiment.

The fourth exemplary embodiment differs from the wireless communication system 4 according to the foregoing second exemplary embodiment in part in the substrate structure and circuit configuration of the sending transmission lines 41 and 42 and the receiving transmission line 51.

Differences from the foregoing second exemplary embodiment will be described in detail below. Descriptions of redundant portions will be omitted as appropriate.

As the receiving transmission line moves to rotate, the undershoot or overshoot of the combined signal can sometimes increase to make the threshold setting of the comparator difficult. The fourth exemplary embodiment is directed to facilitating the threshold setting of the comparator by improving the substrate structure of at least either the sending transmission lines or the receiving transmission line to increase the difference between the outputs of the coupled end and the isolation end of the receiving transmission line.

Figure 11A:
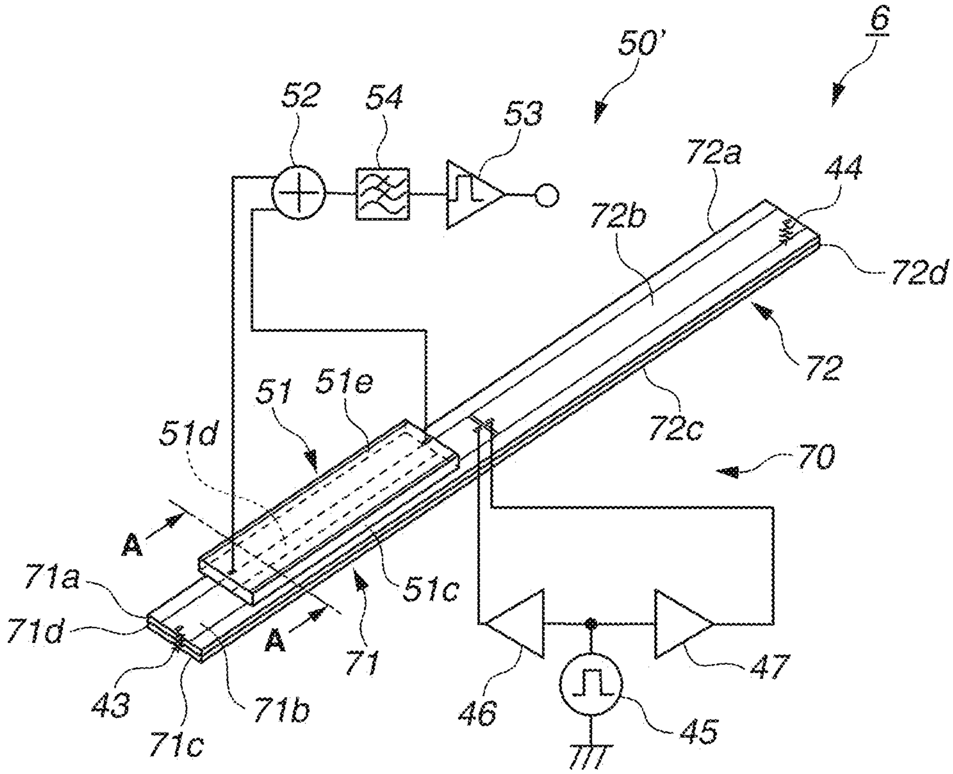
FIGS. 11A and 11B are perspective views illustrating a substrate structure example of sending and receiving transmission lines according to one or more aspects of the present disclosure.
Figure 11B:
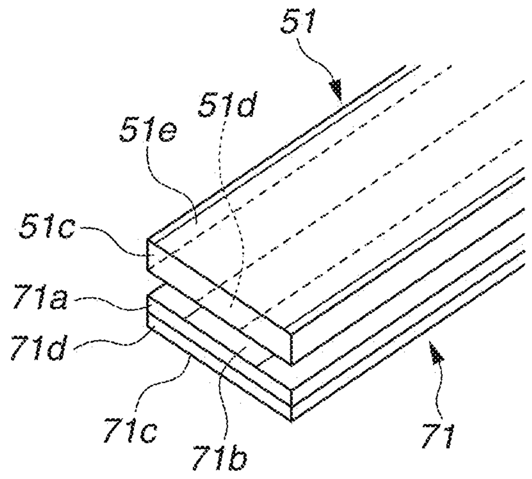

FIG. 11A is a perspective view illustrating the substrate structures of sending transmission lines 71 and 72 and a receiving transmission line 51 of a wireless communication system 6 according to the fourth exemplary embodiment. FIG. 11B is a perspective view for describing the substrate structures of the sending transmission line 71 and the receiving transmission line 51.

Figure 12A:
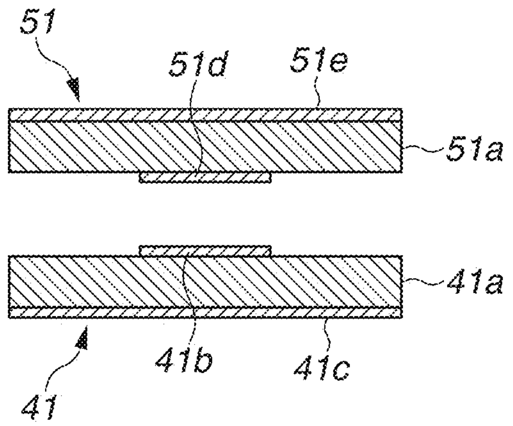
FIGS. 12A to 12D are sectional views illustrating combination examples of substrate structures related to the sending and receiving transmission lines of FIGS. 11A and 11B.
Figure 12B:
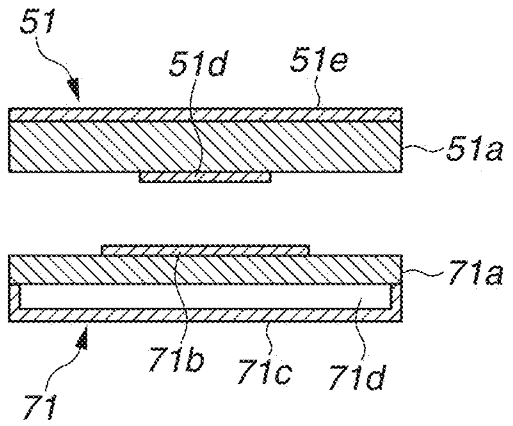
Figure 12C:
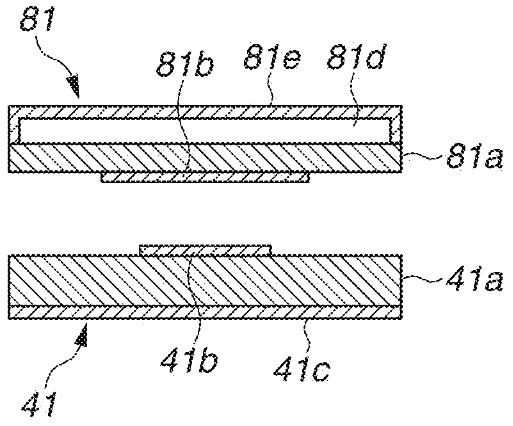
Figure 12D:
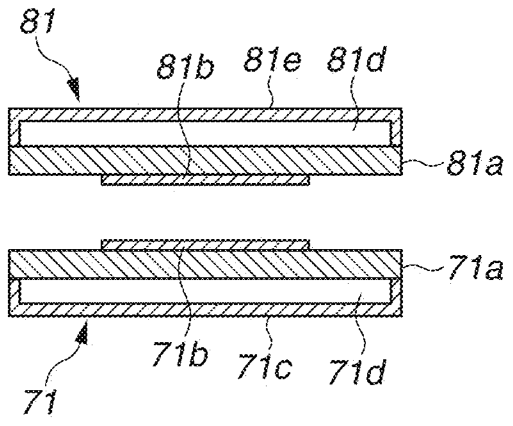

FIG. 12A is a diagram illustrating a first combination example of the substrate structures of the sending and receiving transmission lines. FIG. 12B is a sectional view taken along line A-A of FIG. 11A, illustrating a second combination example of the substrate structures of the sending and receiving transmission lines. FIG. 12C is a diagram illustrating a third combination example of the substrate structures of the sending and receiving transmission lines. FIG. 12D is a diagram illustrating a fourth combination example of the substrate structures of the sending and receiving transmission lines.

As illustrated in FIG. 11A, the wireless communication system 6 includes a transmission apparatus 70 and a reception apparatus 50'.

The transmission apparatus 70 includes the sending transmission lines 71 and 72, termination resistors 43 and 44, a signal source 45, and transmission buffers 46 and 47.

The transmission buffer 46 amplifies the signal input from the signal source 45 and inputs the amplified signal to the feeding point of the sending transmission line 71. The transmission buffer 47 amplifies the signal input from the signal source 45 and inputs the amplified signal to the feeding point of the sending transmission line 72.

The reception apparatus 50' is configured with a filter 54 disposed between the combiner 52 and the comparator 53 of the reception apparatus 50 according to the foregoing second exemplary embodiment. The filter 54 is constituted by a low-pass filter, for example.

The receiving transmission line 51 includes a reception substrate 51*c*, a line pattern 51*d* formed on one surface of the reception substrate 51*c*, and a ground 51*e* formed on the other side of the reception substrate 51*c*.

The line pattern 51*d* is a single-ended line pattern serving as a signal transmission line. The ground 51*e* is a conductive ground for providing a reference potential of the receiving transmission line 51.

In other words, in the example illustrated in FIGS. 11A and 11B, the receiving transmission line 51 is configured as a single-ended microstrip line.

In the example illustrated in FIGS. 11A and 11B, the line pattern 51*d* is longitudinally formed in the lateral center of the bottom surface of the reception substrate 51*c*. The ground 51*e* is formed on the top surface of the reception substrate 51*c* to cover substantially the entire top surface.

The sending transmission line 71 includes a transmission substrate 71*a*, a line pattern 71*b* formed on one surface of the transmission substrate 71*a*, and a ground 71*c* formed on the other side of the transmission substrate 71*a*.

The sending transmission line 72 includes a transmission substrate 72*a*, a line pattern 72*b* formed on one surface of the transmission substrate 72*a*, and a ground 72*c* formed on the other side of the transmission substrate 72*a*.

The line patterns 71*b* and 72*b* are single-ended line patterns serving as signal transmission lines. The grounds 71*c* and 72*c* are conductive grounds for providing a reference potential of the line patterns 71*b* and 72*b*.

In the example illustrated in FIGS. 11A and 11B, the line patterns 71*b* and 72*b* are longitudinally formed in the lateral centers of the top surfaces of the transmission substrates 71*a* and 72*a*.

As illustrated in FIGS. 11A, 11B, and 12B, the ground 71*c* is configured to cover substantially the entire bottom surface of the transmission substrate 71*a*, with a substantially U-shaped cross section. Specifically, the top ends of both lateral end portions of the ground 71*c* are fixed to both lateral end portions of the bottom surface of the transmission substrate 71*a*. The fixing positions are not limited thereto. The ground 71*c* is desirably fixed to a position where the characteristic impedance of the sending transmission line 71 is not much affected, such as the side positions of the transmission substrate 71*a*.

The portion (surface portion) of the ground 71*c* other than both end portions is located away from the bottom surface of the transmission substrate 71*a* so that the surface opposed to the bottom surface of the transmission substrate 71*a* is substantially parallel to the bottom surface. Such a configuration also applies to the ground 72*c*.

A space 71*d* surrounded by the ground 71*c* and the bottom surface of the transmission substrate 71*a* and a space 72*d* surrounded by the ground 72*c* and the bottom surface of the transmission substrate 72*a* are filled with a substance having a relative permittivity lower than that of the transmission substrates 71*a* and 72*a*, respectively.

Specifically, the spaces 71*d* and 72*d* can be filled with a substance such as air, foamed resin, and polytetrafluoroethylene (PTFE), as long as the substance has a relative permittivity lower than that of the transmission substrates 71*a* and 72*a*.

The transmission substrates 71*a* and 72*a* and the reception substrate 51*c* can be formed of typical electrical substrates such as Flame Retardant Type 4 (FR-4). An FR-4 is a plate-like electrical substrate formed by impregnating glass fiber cloth with epoxy resin and thermally curing the epoxy resin, and has a relatively high relative permittivity.

The line widths of the line patterns 71*b* and 72*b* and the line pattern 51*d* are set based on the relative permittivities and thicknesses of the transmission substrates 71*a* and 72*a* and the reception substrate 51*c*, an electrode thickness, characteristic impedance, and frequency. To obtain desired characteristic impedance, if the substrates have relatively high relative permittivity, the line widths are therefore desirably made smaller than if the substrates have relatively low relative permittivity.

More specifically, while there is only a substrate material such as FR-4 between the line patten 51*d* and the ground 51*e*, the substrate material, such as FR-4, and an air layer are interposed between the line patterns 71*b* and 72*b* and the grounds 71*c* and 72*c*. This lowers the apparent relative permittivity of the transmission side. As illustrated in FIG. 12B, given the same characteristic impedance, like 50 [Ω], the line width of the respective sending transmission lines 71 and 72 can thus be made greater than that of the receiving transmission line 51.

FIGS. 13A, 13B, 13C, and 13D are diagrams illustrating the frequency characteristics of the combination examples of FIGS. 12A, 12B, 12C, and 12D with respect to a 2-Gbps transmission signal (input signal to the feeding points). In FIGS. 13A to 13D, the horizontal axis indicates frequency, and the vertical axis the signal level [dB]. The solid line represents the signal level of the signal output from the coupled end with reference to the transmission signal. The broken line represents the signal level of the signal output from the isolation end with reference to the transmission signal.

The combination example of FIG. 12A is the first combination example, which is intended for comparison with the second to fourth combination examples according to the fourth exemplary embodiment. Specifically, the first combination example is a combination example of the substrate structures where the sending transmission lines 41 and 42 and the receiving transmission line 51 are each constituted by a conventional microstrip line. In other words, the sending transmission lines 41 and 42 and the receiving transmission line 51 are each configured so that their ground is disposed on the substrate surface without a gap.

FIG. 12B illustrates the second combination example of the substrate structures illustrated in FIGS. 11A and 11B. In this combination example, the substrate structure of the receiving transmission line 51 is combined with the substrate structure of the sending transmission lines 71 and 72 according to the fourth exemplary embodiment.

FIG. 12C illustrates the third combination example where the substrate structure of a receiving transmission line 81 is combined with the substrate structure of the sending transmission lines 41 and 42, instead of the receiving transmission line 51. The substrate structure of the receiving transmission line 81 is obtained by modifying the ground structure of the receiving transmission line 51 into a structure similar to the ground structure of the sending transmission line 71.

The receiving transmission line 81 includes a reception substrate 81*a*, a line pattern 81*b* formed on one surface of the reception substrate 81*a*, and a ground 81*c* formed on the other side of the reception substrate 81*a*.

The ground 81*c* has a structure similar to that of the ground 71*c*, with a space 81*d* surrounded by the top surface of the reception substrate 81*a* and the ground 81*c*. As with the spaces 71*d* and 72*d*, the space 81*d* is filled with a substance having a relative permittivity lower than that of the reception substrate 81*a*.

FIG. 12D illustrates the fourth combination example where the substrate structure of the sending transmission lines 71 and 72 is combined with that of the receiving transmission line 81.

Now, the frequency characteristics of the signals output from the two output ends of the receiving transmission line at a maximum fundamental frequency of 2-Gbps data, or 1 [GHz], will be described. In other words, signal characteristics "m1" and "m2" in FIGS. 13A to 13D will be described.

The frequency characteristics in the case where the substrate structures of the sending and receiving transmission lines are combined as in the first combination example illustrated in FIG. 12A will initially be described.

Figure 13A:
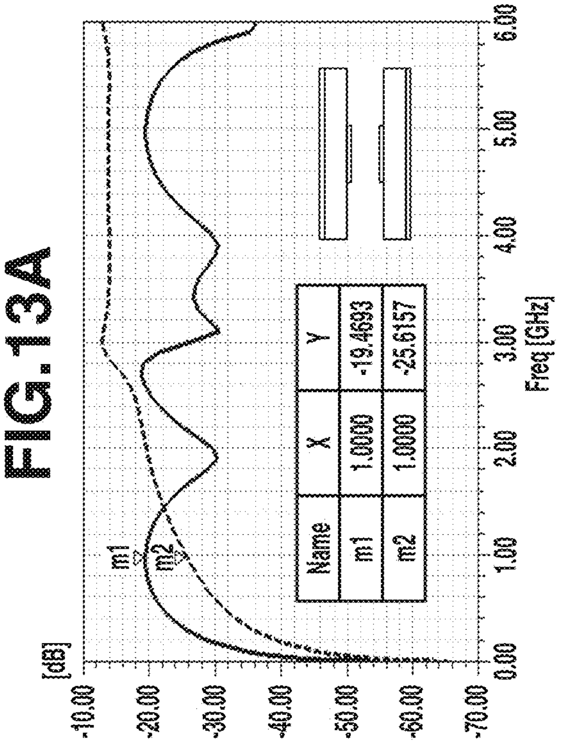
FIGS. 13A to 13D are charts illustrating the frequency characteristics of signals in the respective combination examples of FIGS. 12A to 12D.

As illustrated in FIG. 13A, a difference (hereinafter, referred to as a "level difference") between the signal level of the output signal from the output end of the receiving transmission line 51 functioning as a coupled end and the signal level of the output signal from the output end functioning as an isolation end in such a case is approximately 6 [dB].

Figure 13B:
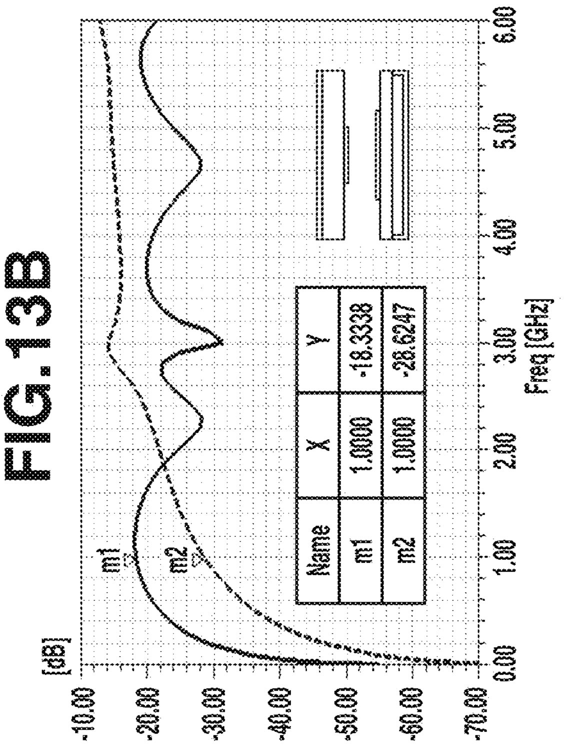
Figure 13C:
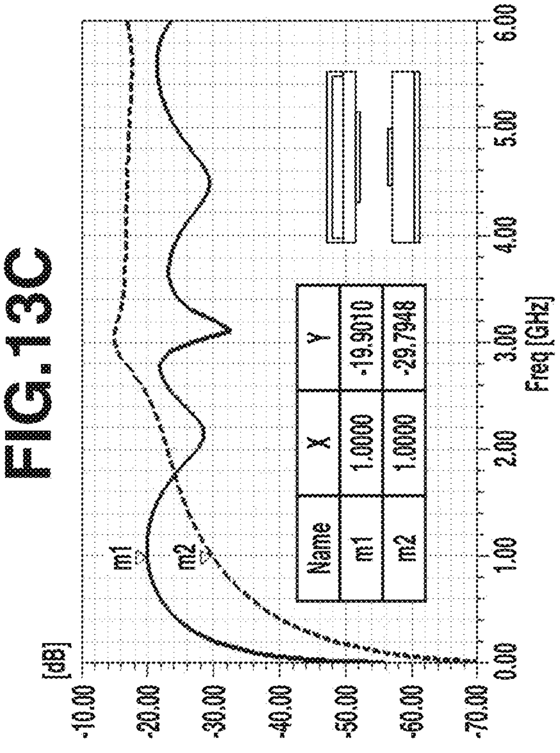

Next, level differences between the output signals from the coupled ends and the isolation ends of the receiving transmission lines 51 and 81 in the cases where the substrate structures are combined as in the second and third combination examples illustrated in FIGS. 12B and 12C are calculated. As illustrated in FIGS. 13B and 13C, the level differences in both the combination examples are approximately 10 [dB].

Figure 13D:
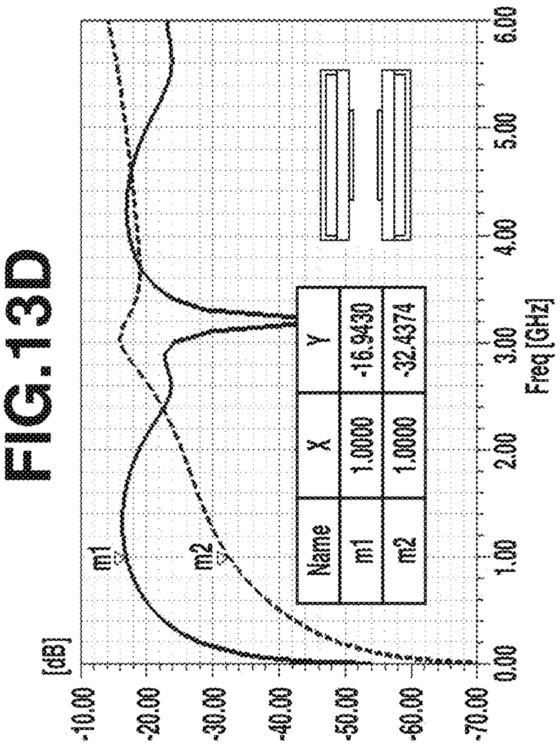

As illustrated in FIG. 13D, a level difference between the output signals from the coupled end and the isolation end of the receiving transmission line 81 in the case where the substrate structures are combined as in the fourth combination example illustrated in FIG. 12D is approximately 15 [dB].

It can be seen that employing the structure of the ground 71*c* or 81*c* for the substrate structure of either the sending transmission lines or the receiving transmission line increases the level difference by approximately 4 [dB] as compared with that of the conventional structure.

It can also be seen that employing the structures of the grounds 71*c* and 81*c* for the substrate structures of both the sending transmission lines and the receiving transmission line increases the level difference by approximately 9 [dB] as compared to that of the conventional structure.

FIGS. 14A, 14B, 14C, and 14D are charts illustrating signal waveforms of combined signals of the output signals from both ends of the receiving transmission line when a 2-Gbps signal is transmitted using the transmission lines of the combination examples illustrated in FIGS. 12A to 12D. More specifically, FIGS. 14A to 14D are charts illustrating the signal waveform after the ripple component of the combined signal is filtered off.

In FIGS. 14A to 14D, the horizontal axis indicates time, and the vertical axis voltage. The 2-Gbps input (transmission) signal is denoted by IN2. The filtered combined signals when the movement position of the receiving transmission line is 0 [mm] and −30 [mm] are denoted by FOUT2. In FIGS. 14A to 14D, the respective solid-lined waveform represents the waveform of the filtered combined signal FOUT2 at the movement position of −30 [mm]. The respective broken-lined waveform represents the waveform of the filtered combined signal FOUT2 at the movement position of 0 [mm].

The respective filtered waveform of −30 [mm] (solid line) represents the signal when the entire receiving transmission line is located on one of the two sending transmission lines. The respective waveform of 0 [mm] (broken line) represents the signal when the receiving transmission line is located at the center of the two sending transmission lines (located over the opposed two feeding points or two termination points).

As illustrated in FIGS. 14A to 14D, each of the waveforms of −30 [mm] has large signal widths and not much undershoot or overshoot because the signal of the ordinary coupled end is mixed with a small amount of signal of the isolation end. By contrast, in the cases of the waveforms of 0 [mm], a half of the receiving transmission line functions as a coupled end, and the other half functions as an isolation end. Each of the waveforms thus has small signal widths and high instantaneous signal strength, with a lot of signal component of the isolation end and large undershoot and overshoot. Thus, depending on the threshold setting of the comparator, the undershoot or overshoot of the combined signal FOUT2 can be erroneously detected as a falling edge or rising edge. The erroneous detection results in an output error of the comparator, in which case the transmission signal is unable to be normally demodulated.

Figure 14A:
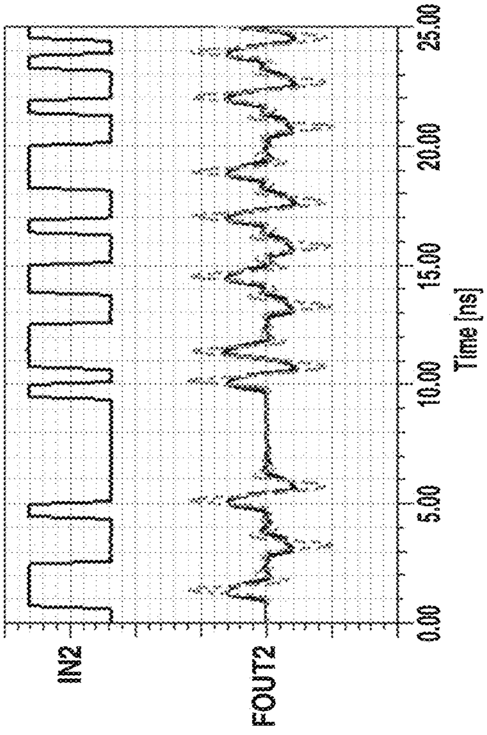
FIGS. 14A to 14D are charts illustrating the time characteristics of the signals in the respective combination examples of FIGS. 12A to 12D.

As illustrated in FIG. 14A, in the first combination example of the conventional substrate structures, a difference between the magnitude of the combined signal FOUT2 at the movement position of −30 [mm] and the magnitude of the undershoot or overshoot of the combined signal FOUT2 at the movement position of 0 [mm] is approximately 21 [mV]. This difference will hereinafter be referred to as a "peak voltage difference". The peak voltage difference relates to the settable range of the threshold of the comparator. The greater the peak voltage difference, the wider the settable range.

Figure 14B:
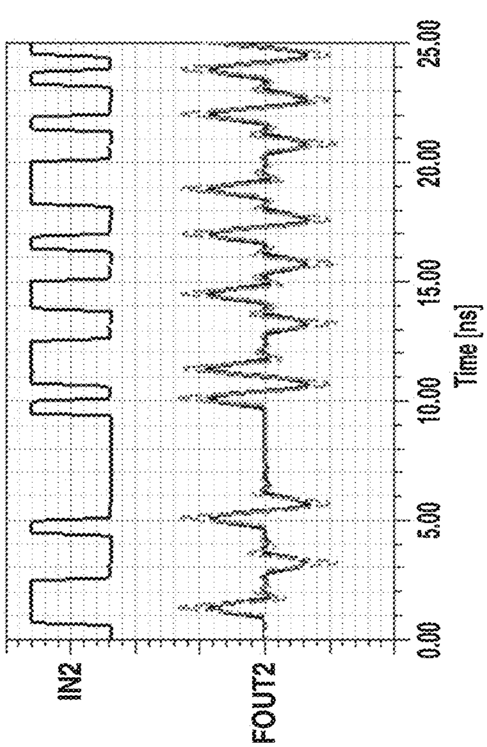
Figure 14C:
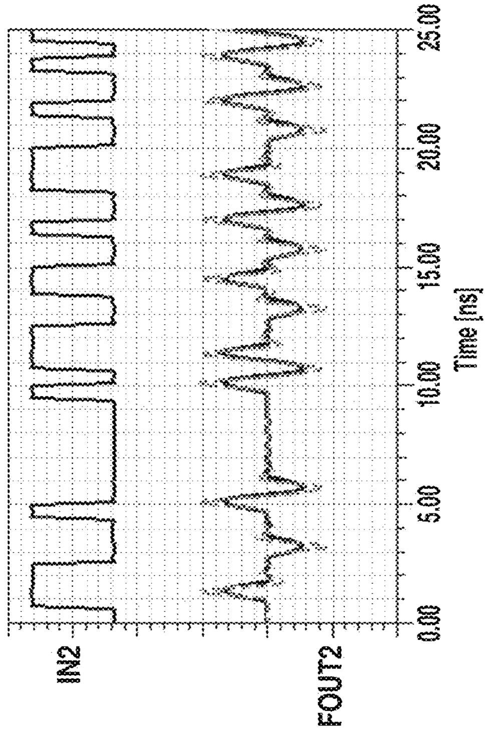
Figure 14D:
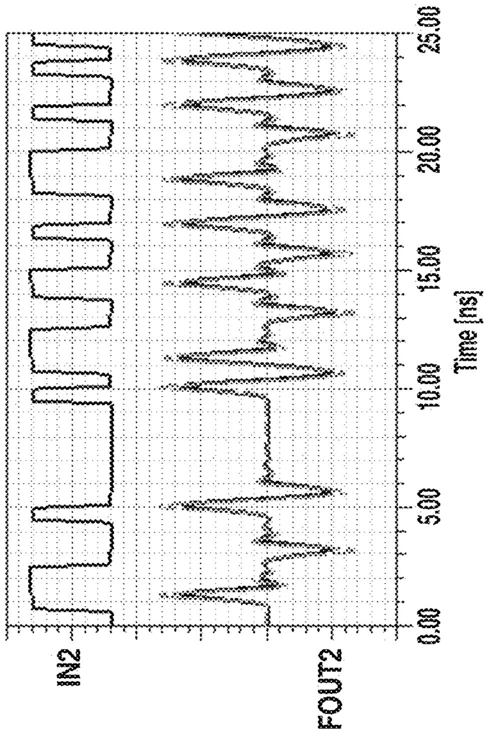

By contrast, in the second and third combination examples of the substrate structures where the ground(s) of either the sending transmission lines or the receiving transmission line is/are separated from the substrate(s), as illustrated in FIGS. 14B and 14C, the peak voltage difference improves to approximately 47 [mV] and approximately 39 [mV], respectively. If such a combined signal FOUT2 is input to the comparator, the settable range of the threshold voltage at which the comparator signal is switched increases, making comparator output errors less likely. As illustrated in FIG. 14D, in the fourth combination example where the grounds of both the sending transmission lines and the receiving transmission line are separated from the substrates, the peak voltage difference is approximately 88.6 [mV]. This further widens the settable range of the input threshold of the comparator, enabling error reduction.

In the combination examples illustrated in FIGS. 12B to 12D, the thicknesses of the transmission substrates 71*a* and 72*a* and the reception substrate 81*a* are reduced to approximately one half those of the conventional substrates of FIG. 12A in forming the grounds 71*c*, 72*c*, and 81*c*. However, such a configuration is not restrictive. For example, the substrates may have other thicknesses, such as the same thicknesses as those of the conventional substrates of FIG. 12A. Both lateral end portions of the grounds 71*c*, 72*c*, and 81*c* may also have other thicknesses.

As described above, in the wireless communication system 6 according to the fourth exemplary embodiment, at least either the sending transmission lines or the receiving transmission line is/are configured so that the ground(s) for providing a reference potential is/are located at least in part away from the substrate(s) constituting the transmission line(s). Specifically, each such transmission line is configured so that at least a part (surface portion) of the ground is opposed to and located away from the surface opposite to the line-patterned surface of the substrate constituting the transmission line. In addition, the spaces 71*d*, 72*d*, and 82*d* each surrounded by the opposite surface of the substrate and the surface portion and both end portions of the ground are filled with a substance (such as air) having a relative permittivity lower than that of the substrate.

Such a configuration can increase the level difference between the output signals from the output ends functioning as the coupled end and the isolation end of the receiving transmission line compared to the conventional structure where both the sending transmission lines and the receiving transmission line include a reference potential ground formed on their substrate surfaces.

As a result, the difference (peak voltage difference) between the magnitude of the undershoot or overshoot when the receiving transmission line is located at the center of the two sending transmission lines and the magnitude of the combined signal FOUT2 when the receiving transmission line is located on either one of the sending transmission lines. This can increase the setting range of the threshold voltage at which the comparator signal is switched, and make comparator output errors less likely.

Next, a fifth exemplary embodiment of the present disclosure will be described. FIGS. 15A to 18D are diagrams illustrating the fifth exemplary embodiment.

The fifth exemplary embodiment differs from the foregoing fourth exemplary embodiment in that the two sending transmission lines and the receiving transmission line are constituted by differential lines.

Figure 15A:
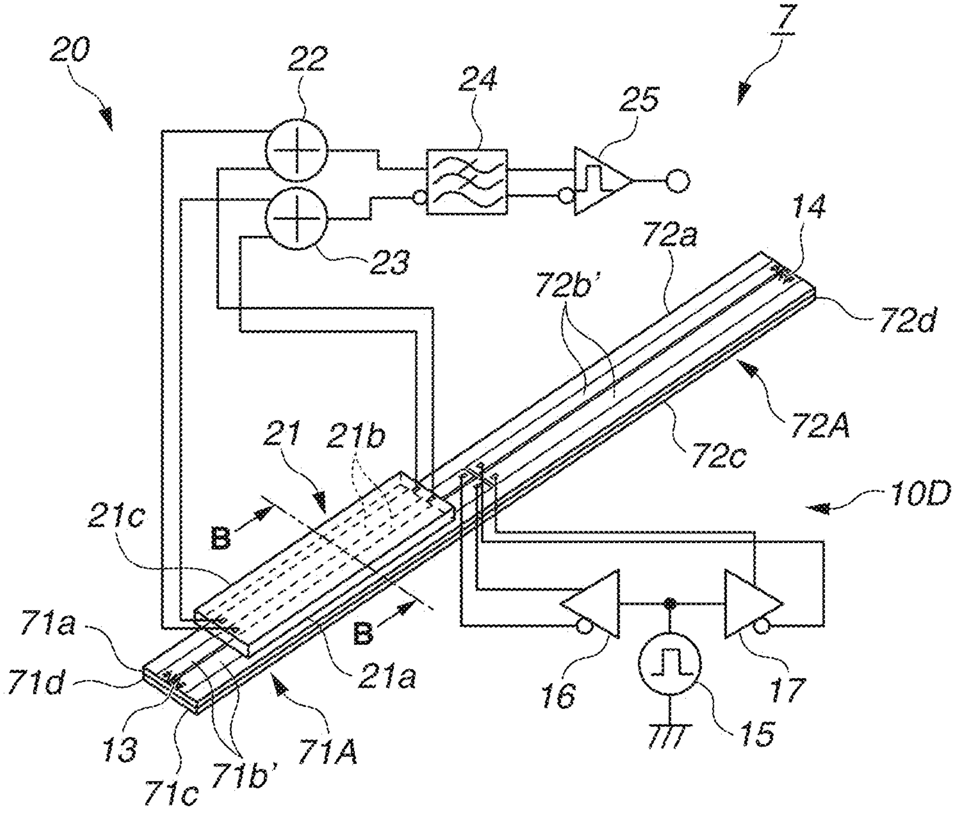
FIGS. 15A and 15B are perspective views illustrating a substrate structure example of sending and receiving transmission lines according to one or more aspects of the present disclosure.
Figure 15B:
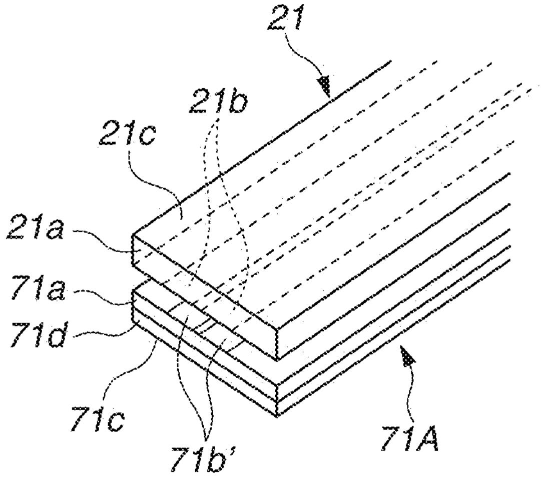

FIG. 15A is a perspective view illustrating the substrate structures of sending transmission lines 71A and 72A and a receiving transmission line 21 of a wireless communication system 7 according to the fifth exemplary embodiment. FIG. 15B is a perspective view for describing the substrate structures of the sending transmission line 71A and the receiving transmission line 21.

Figure 16A:
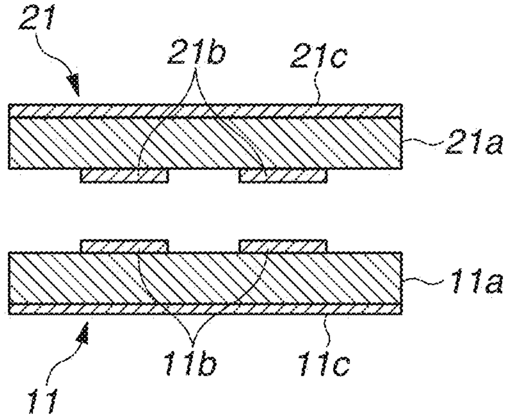
FIGS. 16A to 16D are sectional views illustrating combination examples of the substrate structures related to the sending and receiving transmission lines of FIGS. 15A and 15B.
Figure 16B:
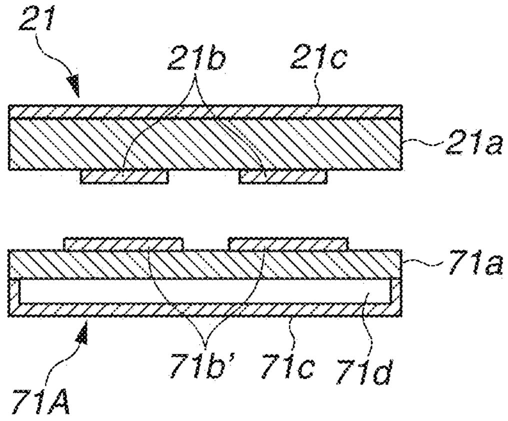
Figure 16C:
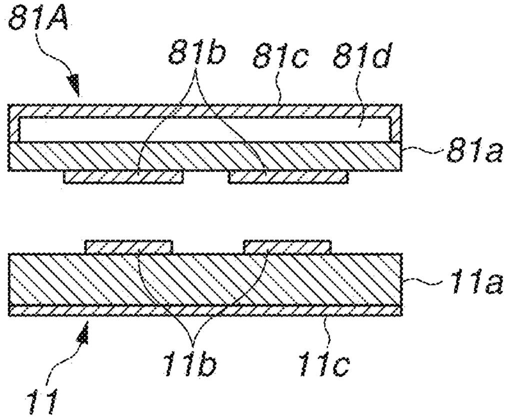
Figure 16D:
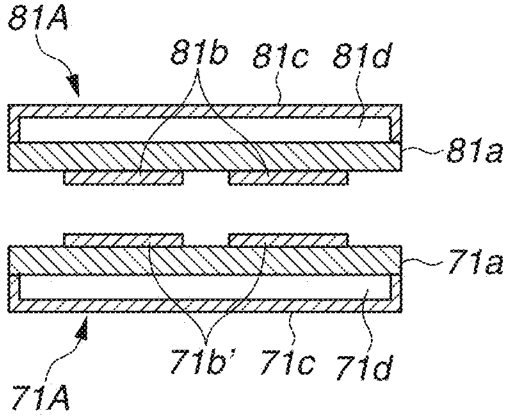

FIG. 16A is a diagram illustrating a fifth combination example of the substrate structures of the sending and receiving transmission lines. FIG. 16B is a sectional view taken along line B-B of FIG. 15A, illustrating a sixth combination example of the substrate structures of the sending and receiving transmission lines. FIG. 16C is a diagram illustrating a seventh combination example of the substrate structures of the sending and receiving transmission lines. FIG. 16D is a diagram illustrating an eighth combination example of the substrate structures of the sending and receiving transmission lines.

As illustrated in FIGS. 15A and 15B, the wireless communication system 7 includes a transmission apparatus 10D and a reception apparatus 20.

The transmission apparatus 10D is configured to include the sending transmission lines 71A and 72A instead of the sending transmission lines 11 and 12 in the transmission apparatus 10 according to the foregoing first exemplary embodiment.

The sending transmission lines 71A and 72A are constituted by replacing the structure of the line patterns 71*b* and 72*b* on the sending transmission lines 71 and 72 according to the foregoing fourth exemplary embodiment with that of differential line patterns while maintaining the structure of the grounds 71*c* and 72*c* intact. In other words, the sending transmission lines 71A and 72A include differential line patterns 71*b*' and 72*b*' instead of the single-ended line patterns 71*b* and 72*b*.

FIGS. 17A, 17B, 17C, and 17D are charts illustrating the frequency characteristics of the combination examples of FIGS. 16A, 16B, 16C, and 16D with respective to a 2-Gbps transmission signal (input signal to the feeding points). In FIGS. 17A to 17D, the horizontal axis indicates frequency, and the vertical axis indicates the signal level [dB]. The solid line represents the signal level of the signal output from the coupled end with reference to the transmission signal. The broken-lined waveform represents the signal level of the signal output from the isolation end with reference to the transmission signal.

The combination example of FIG. 16A is the fifth combination example, which is intended for comparison with the sixth to eighth combination examples according to the fifth exemplary embodiment. Specifically, in the combination example of the substrate structures, the sending transmission lines 11 and 12 and the receiving transmission line 21 are each constituted by a conventional microstrip line. In other words, the sending transmission lines 11 and 12 and the receiving transmission line 21 are each configured so that their grounds are disposed on the substrate surface without a gap.

The combination example of FIG. 16B is the sixth combination example of the substrate structures illustrated in FIGS. 15A and 15B, where the substrate structure of the receiving transmission line 21 is combined with the substrate structure of the sending transmission lines 71A and 72A according to the fifth exemplary embodiment.

The combination example of FIG. 16C is the seventh combination example where the substrate structure of a receiving transmission line 81A is combined with that of the sending transmission lines 11 and 12. The receiving transmission line 81A is configured with the ground structure of the receiving transmission line 21 modified into the same structure as the ground structure of the receiving transmission line 81.

The receiving transmission line 81A is configured with a differential line pattern 81*b*' that is a line pattern of differential lines instead of the single-ended line pattern 81*b* in the receiving transmission line 81.

The combination example of FIG. 16D is the eighth combination example where the substrate structure of the sending transmission lines 71A and 72A is combined with that of the receiving transmission line 81A.

Now, the frequency characteristics of the signals output from the two output ends of the receiving transmission line at the maximum fundamental frequency of 2-Gbps data, or 1 [GHz], will be described. More specifically, signal characteristics "m1" and "m2" in FIGS. 17A to 17D will be described.

The frequency characteristics in the case where the substrate structures of the transmission and reception substrates are combined as in the fifth combination example illustrated in FIG. 16A will initially be described.

Figure 17A:
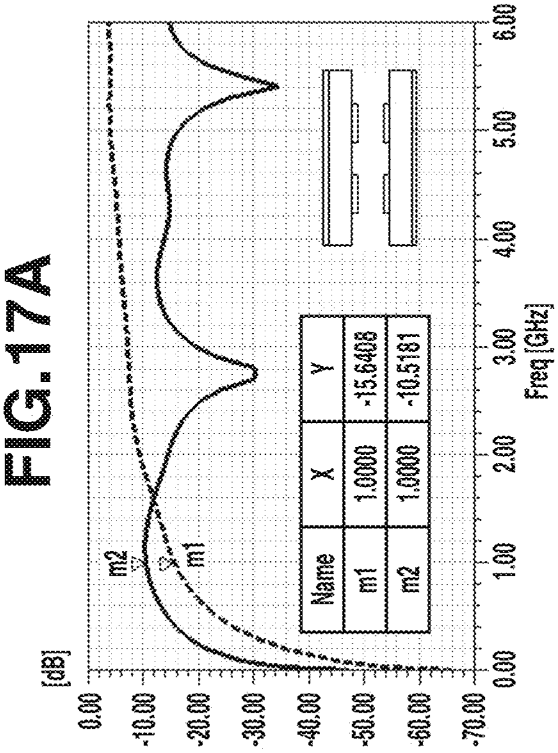
FIGS. 17A to 17D are charts illustrating the frequency characteristics of signals in the respective combination examples of FIGS. 16A to 16D.

As illustrated in FIG. 17A, the level difference between the output signals from the output ends functioning as the coupled end and the isolation end of the receiving transmission line 21 in such a case is approximately 5 [dB].

Figure 17B:
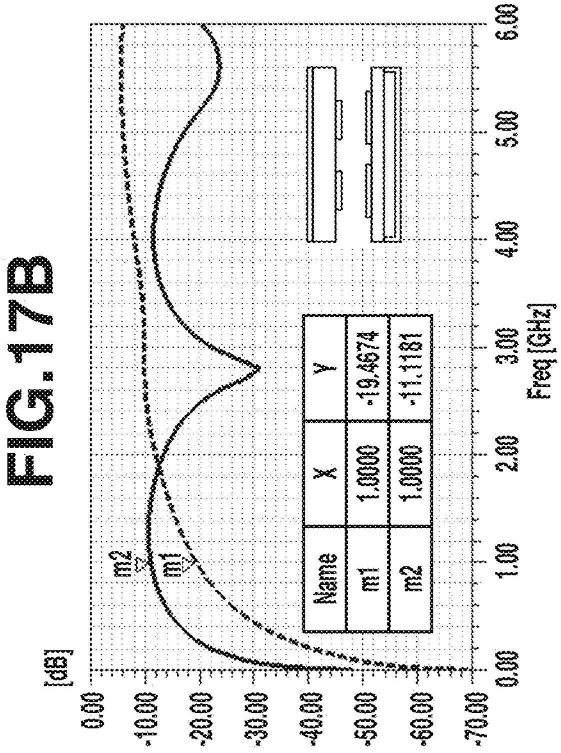
Figure 17C:
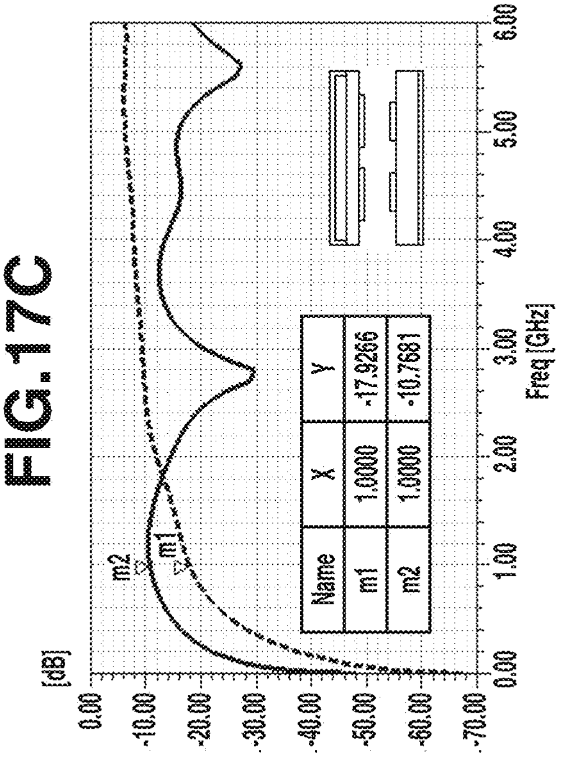

Next, the level differences between the output signals from the coupled ends and the isolation ends of the receiving transmission lines 21 and 81A in the cases where the substrate structures are combined as in the sixth and seventh combination examples illustrated in FIGS. 16B and 16C are calculated. As illustrated in FIGS. 17B and 17C, the level differences in both the combination examples are approximately 7 to 8 [dB].

Figure 17D:
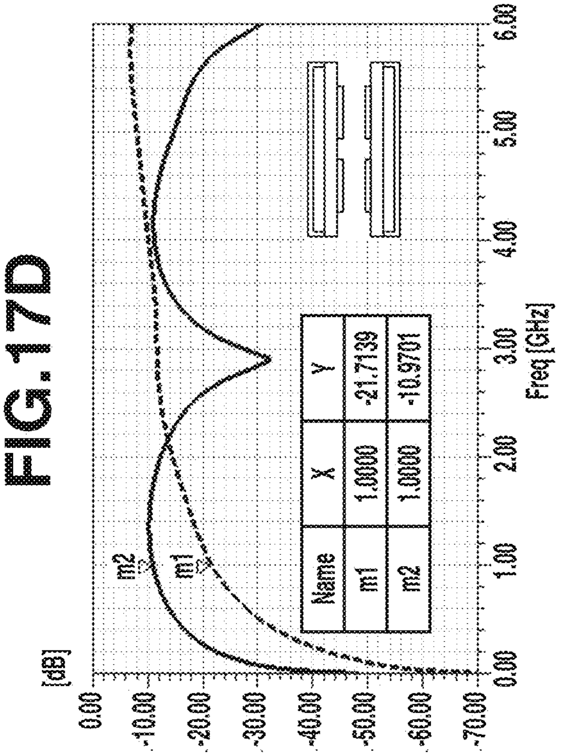

As illustrated in FIG. 17D, the level difference between the output signals from the coupled end and the isolation end of the receiving transmission line 81A in the case where the substrate structures are combined as in the eighth combination example illustrated in FIG. 16D is approximately 11 [dB].

It can be seen that if either one of the substrate structures of the sending and receiving transmission lines has the structure of the ground 71*c* or 81*c*, the level difference increases by approximately 2 to 3 [dB] as compared with that of the conventional structure.

It can also be seen that if both the substrate structures of the sending and receiving transmission lines include the structure of the ground 71*c* or 81*c*, the level difference increases by approximately 6 [dB] compared with that of the conventional structure.

FIGS. 18A, 18B, 18C, and 18D are charts illustrating signal waveforms of combined signals of the output signals from both ends of the receiving transmission line when a 2-Gbps signal is transmitted using the transmission lines of the combination examples illustrated in FIGS. 16A to 16D. More specifically, FIGS. 18A to 18D are charts illustrating the signal waveform after the ripple component of the combined signals is filtered off.

In FIGS. 18A to 18D, the horizontal axis indicates time, and the vertical axis voltage. The filtered combined signals when the movement position of the receiving transmission line is 0 [mm] and −40 [mm] are denoted by FOUT3. In FIGS. 18A to 18D, the respective solid-lined waveform represents the filtered combined signal FOUT3 at the movement position of −40 [mm]. The respective broken-lined waveform represents the filtered combined signal FOUT3 at the movement position of 0 [mm].

The respective filtered waveform of −40 [mm] (solid line) indicates the signal when the entire receiving transmission line is located on one of the two sending transmission lines. The respective waveform of 0 [mm] (broken line) indicates the signal when the receiving transmission line is located at the center of the two sending transmission lines (located over the opposed two feeding points or two termination points).

As illustrated in FIGS. 18A to 18D, each of the waveforms of −40 [mm] has large signal widths and not much undershoot or overshoot since the signal of the ordinary coupled end is mixed with a small amount of signal of the isolation end. By contrast, in the cases of the waveforms of 0 [mm], a half of the receiving transmission line functions as a coupled end, and the other half functions as an isolation end. Each of the waveforms thus has small signal widths and high instantaneous signal strength, with a lot of signal component of the isolation end and large undershoot and overshoot.

Figure 18A:
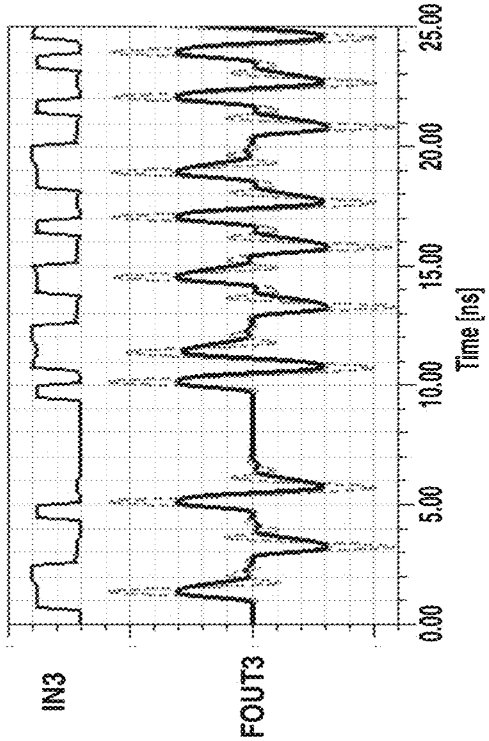
FIGS. 18A to 18D are charts illustrating the time characteristics of the signals in the respective combination examples of FIGS. 16A to 16D.

As illustrated in FIG. 18A, in the fifth combination example of the conventional substrate structures, the peak voltage difference between the combined signal FOUT3 at the position of −40 [mm] and the undershoot or overshoot of the combined signal FOUT3 at the position of 0 [mm] is approximately 205 [mV].

Figure 18B:
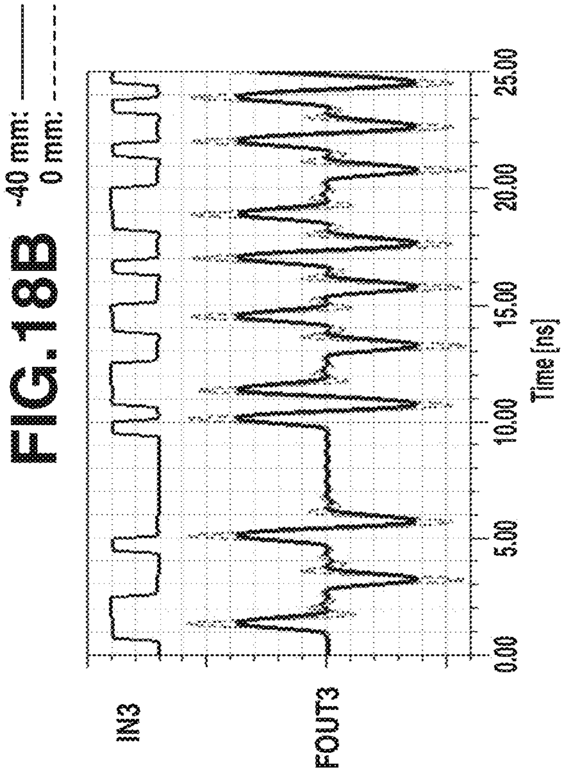
Figure 18C:
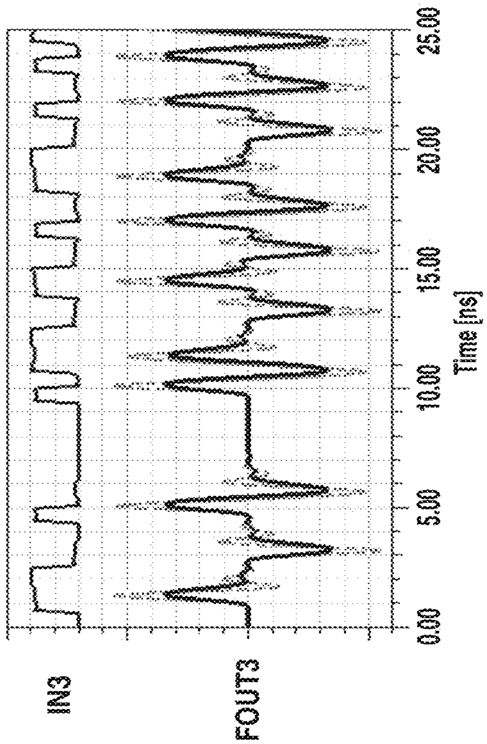
Figure 18D:
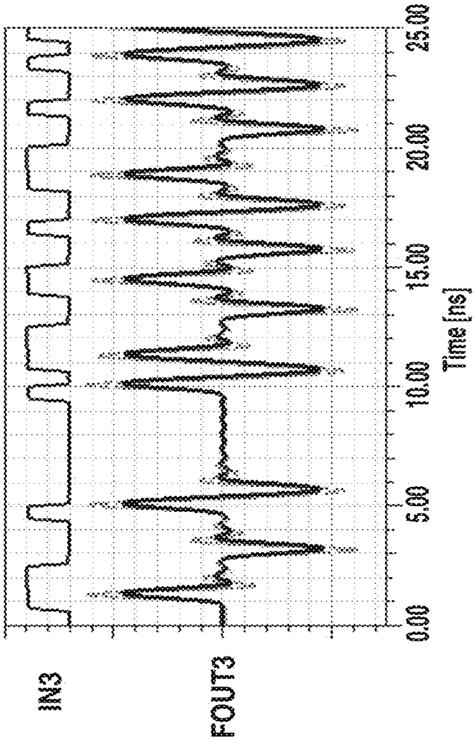

By contrast, in the sixth and seventh combination examples of the substrate structures where the ground(s) of either the sending transmission lines or the receiving transmission line is/are separated from the substrate(s), as illustrated in FIGS. 18B and 18C, the peak voltage difference improves to approximately 265 [mV] and approximately 216 [mV], respectively. If such a combined signal FOUT3 is input to the comparator 25, the settable range of the threshold voltage at which the signal of the comparator 25 is switched increases, making output errors of the comparator 25 less likely. As illustrated in FIG. 18D, in the fourth combination example where the grounds of both the sending transmission lines and the receiving transmission line are separated from the substrates, the peak voltage difference is approximately 315 [mV]. This further widens the settable range of the input threshold of the comparator 25, enabling error reduction.

As described above, the wireless communication system 7 according to the fifth exemplary embodiment includes the sending transmission lines 71A and 72A and the receiving transmission line 81A constituted by differential lines. In addition, the grounds 71C, 72*c*, and 81*c* of the sending and receiving transmission lines 71A, 72A, and 81A are configured to be located away from the substrates as in the foregoing fourth exemplary embodiment.

Such a configuration can further increase the peak voltage difference compared to the foregoing fourth exemplary embodiment, whereby the setting range of the threshold voltage at which the comparator signal is switched can be further widened. This can make comparator output errors even less likely.

Figure 19:
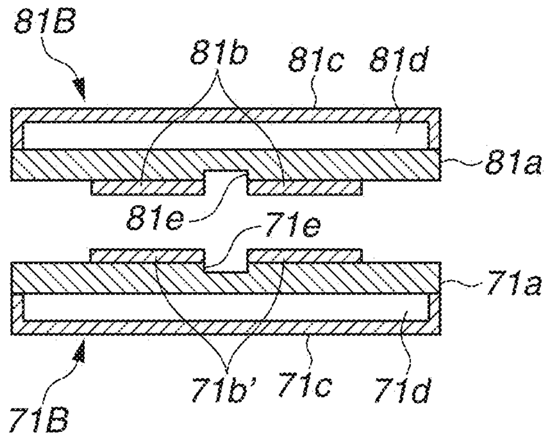
FIG. 19 is a sectional view illustrating a substrate structure example of sending and receiving transmission lines according to one or more aspects of the present disclosure.
Figure 20:
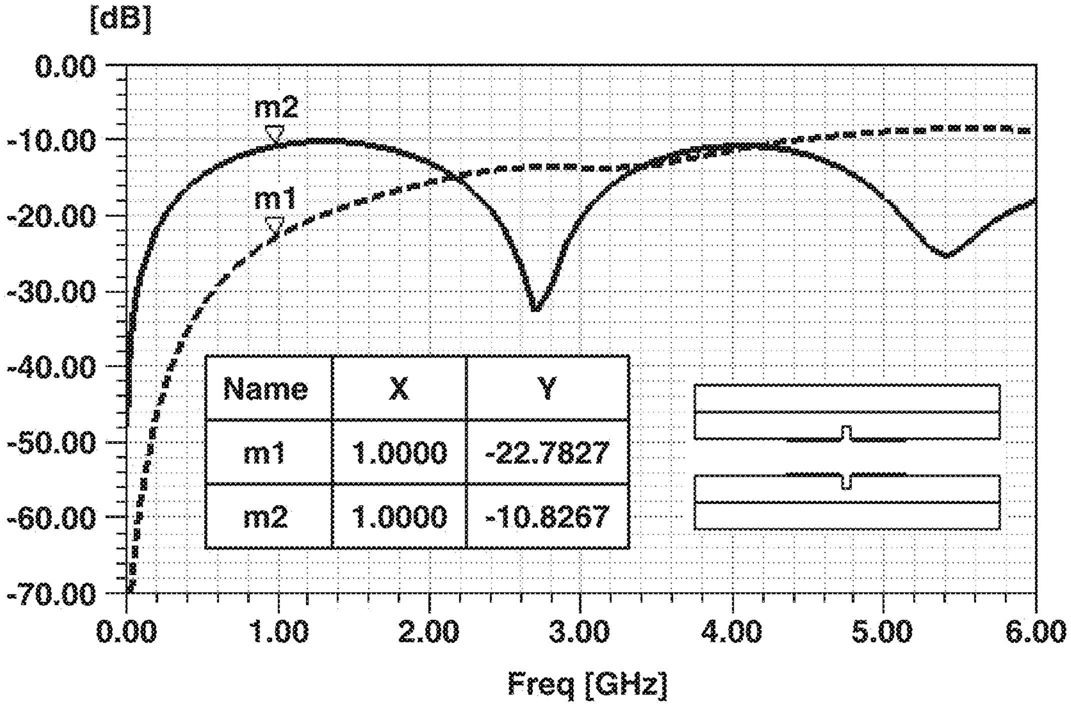
FIG. 20 is a chart illustrating the frequency characteristics of signals in the substrate structure example of FIG. 19.
Figure 21:
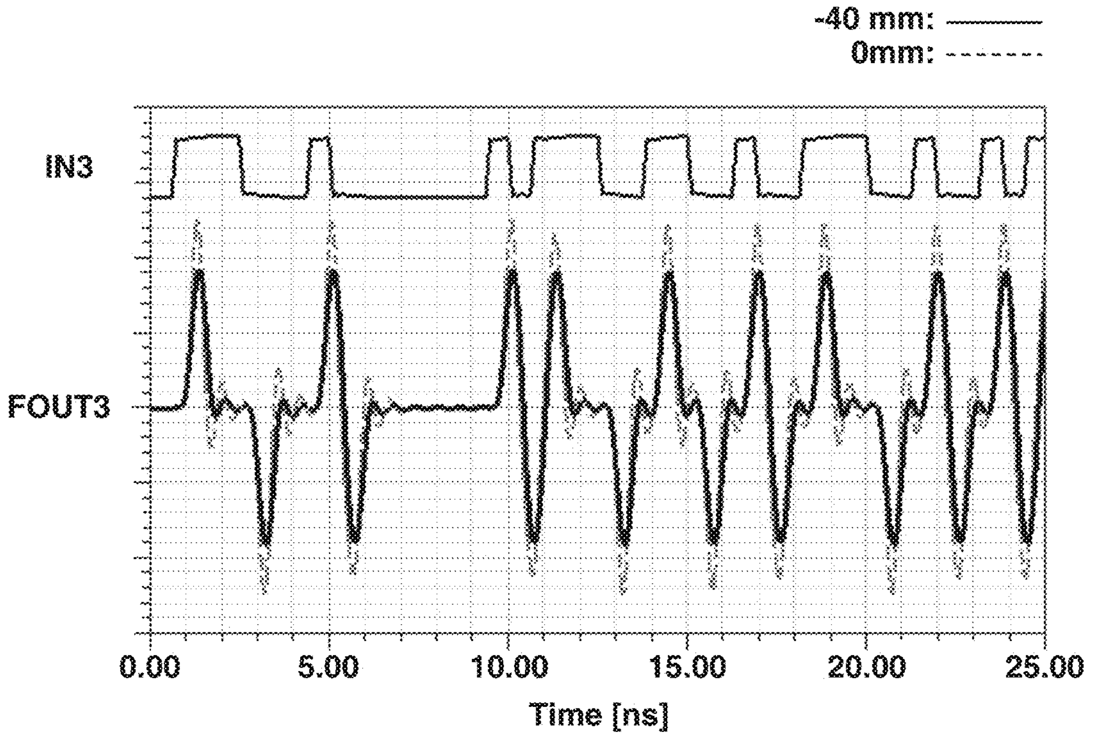
FIG. 21 is a chart illustrating the time characteristics of the signals in the substrate structure example of FIG. 19.

Next, a sixth exemplary embodiment of the present disclosure will be described. FIGS. 19 to 21 are diagrams illustrating the sixth exemplary embodiment.

The sixth exemplary embodiment differs from the foregoing fifth exemplary embodiment in that a groove is formed between a pair of traces constituting a differential line on the surface of each of the transmission and reception substrates where a differential line pattern is formed.

FIG. 19 is a sectional view illustrating a substrate structure example of sending transmission lines 71B and 72B and a receiving transmission line 81B according to the sixth exemplary embodiment.

As illustrated in FIG. 19, the sending transmission lines 71B and 72B are configured so that the sending transmission lines 71A and 72A according to the foregoing fifth exemplary embodiment have grooves 71*e* and 72*e* formed in the surfaces of the transmission substrates 71*a* and 72*a* where the differential line patterns 71*b*' and 72*b*' are formed.

Specifically, the grooves 71*e* and 72*e* are cut in the substrate portions between the respective pairs of traces constituting the differential lines on the surfaces where the differential line patterns 71*b*' and 72*b*' are formed, along the longitudinal direction of the traces.

The receiving transmission line 81B is configured so that the receiving transmission line 81A according to the foregoing fifth exemplary embodiment has a groove 81*e* formed in the surface of the reception substrate 81*a* where the differential line pattern 81*b*' is formed.

Specifically, as with the grooves 71*e* and 72*e*, the groove 81*e* is cut in the substrate portion between the pair of traces constituting the differential lines on the surface where the differential line pattern 81*b*' is formed, along the longitudinal direction of the traces.

The grooves 71*e* and 72*e* are filled with a substance having a relative permittivity lower than that of the transmission substrates 71*a* and 72*a*. Similarly, the groove 81*e* is filled with a substance having a relative permittivity lower than that of the reception substrate 81*a*.

Specifically, the grooves 71*e*, 72*e*, and 81*e* can be filled with a substance such as air, foamed resin, and PTFE, as long as the substance has a relative permittivity lower than that of the transmission substrates 71*a* and 72*a* or the reception substrate 81*a*. In the sixth exemplary embodiment, the grooves 71*e*, 72*d*, and 81*e* are filled with air.

The grooves 71*e*, 72*e*, and 81*e* are not limited to the configuration of being formed along the differential line patterns over the entire longitudinal lengths of the differential line patterns, and other configurations may be employed. For example, the grooves may be formed for a length shorter than the entire longitudinal lengths of the differential line patterns. A plurality of grooves having a predetermined length may be formed with a gap therebetween.

FIG. 20 is a chart illustrating the frequency characteristics of the substrate structures of FIG. 19 with respect to a 2-Gbps transmission signal (input signal to the feeding points). In FIG. 20, the horizontal axis indicates frequency, and the vertical axis the signal level [dB]. The solid line represents the signal level of the signal output from the coupled end with reference to the transmission signal. The broken line represents the signal level of the signal output from the isolation end with reference to the transmission signal.

The frequency characteristics of the substrate structures illustrated in FIG. 19 will be described. As illustrated in FIG. 20, the level difference between the output signals from the coupled end and the isolation end of the receiving transmission line 81B at the maximum fundamental frequency of the 2-Gbps data, or 1 [GHz], is approximately 12 [dB].

It can be seen that the formation of the grooves 71*e*, 72*e*, and 81*e* increases the level distance by 1 [dB] as compared to the substrate structures of the eighth combination example according to the foregoing fifth exemplary embodiment.

FIG. 21 is a chart illustrating signal waveforms obtained by combining the output signals from both ends of the receiving transmission line 81B when a 2-Gbps signal is transmitted using the substrate structures illustrated in FIG. 19, followed by filtering of the ripple components of the combined signals. In FIG. 21, the horizon axis indicates time, and the vertical axis voltage. The filtered combined signals when the movement position of the receiving transmission line is 0 [mm] and −40 [mm] are denoted by FOUT3.

As illustrated in FIG. 21, the peak voltage difference between the magnitude of the signal at the movement position of −40 mm and the magnitude of the undershoot or overshoot at the movement position of 0 mm is approximately 323 [mV]. In other words, the peak voltage difference is further widened by approximately 8 [mV] as compared to the peak voltage difference of 315 [mv] in the eighth combination example of the foregoing fifth exemplary embodiment. This increases the settable range of the input threshold of the comparator, enabling reduction of comparator output errors.

As described above, the wireless communication system 7 according to the sixth exemplary embodiment includes the sending transmission lines 71B and 72B and the receiving transmission line 81B. In addition, the grooves 71*e* and 72*e* are formed in the surfaces of the transmission substrates 71*a* and 72*a* of the sending transmission lines 71B and 72B where the differential line patterns 71*b*' and 72*b*' are formed. Moreover, the groove 81*e* is formed in the surface of the reception substrate 81*a* of the receiving transmission line 81B where the differential line pattern 81*b*' is formed.

Such a configuration can increase the peak voltage difference as compared to the eighth combination example of the foregoing fifth exemplary embodiment, and further widen the setting range of the threshold voltage at which the comparator signal is switched. This can make comparator output errors even less likely.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-112921, filed Jul. 10, 2023, which is hereby incorporated by reference herein in its entirety.

What is claimed is:

1. A wireless communication system comprising:

a transmission apparatus including at least two sending transmission lines located with at least either feeding points of a signal or termination points opposed to each other, and a transmission unit configured to input a signal to each of the feeding points of the at least two sending transmission lines; and a reception apparatus including a receiving transmission line configured to move along the at least two sending transmission lines, establish electromagnetic field coupling with the sending transmission lines, and receive an excited signal, and an output unit configured to receive respective signals from one end and another end of the receiving transmission line corresponding to signals propagating from different directions along the receiving transmission line, and output a signal to be subjected to demodulation processing based on a relationship between the respective signals received from the one end and the another end.

2. The wireless communication system according to claim 1, wherein at least either the at least two sending transmission lines or the receiving transmission line include(s) a ground configured to provide a reference potential of the transmission line(s), at least a part of the ground lying away from a substrate constituting the transmission line(s).

3. The wireless communication system according to claim 2, wherein the at least part of the ground is opposed to an opposite surface of the substrate from a surface where a line pattern is formed.

4. The wireless communication system according to claim 3, wherein a space between the at least part of the ground and the opposite surface is filled with a substance having a relative permittivity different from that of the substrate.

5. The wireless communication system according to claim 2, wherein the at least two sending transmission lines and the receiving transmission line each include differential lines, and wherein at least either the at least two sending transmission lines or the receiving transmission line has/have a groove in at least part of a portion between a pair of traces constituting the differential lines of the substrate constituting the transmission line(s).

6. The wireless communication system according to claim 5, wherein the groove is filled with a substance having a relative permittivity lower than that of the substrate.

7. The wireless communication system according to claim 1, wherein the output unit includes a combination unit configured to combine the signals received from the one end and the another end of the receiving transmission line, and is configured to output a signal combined by the combination unit as the signal to be subjected to the demodulation processing.

8. The wireless communication system according to claim 7, wherein impedance of lines from the output unit to the one end and the another end of the receiving transmission line is matched with characteristic impedance of the receiving transmission line.

9. The wireless communication system according to claim 1, wherein the output unit is configured to output either one of the respective signals received from the one end and the another end of the receiving transmission line as the signal to be subjected to the demodulation processing.

10. The wireless communication system according to claim 9, wherein the output unit is in connection to a termination resistor and a demodulation unit configured to perform the demodulation processing and includes a switching unit configured to connect either one of the one end and the another end to the demodulation unit and connect the other to the termination resistor.

11. The wireless communication system according to claim 1, wherein the transmission unit is configured to input a same signal to the respective feeding points of the at least two sending transmission lines at same timing.

12. The wireless communication system according to claim 1, wherein the output unit includes a reduction unit configured to reduce a signal component of an isolation end in the signal output from the receiving transmission line.

13. The wireless communication system according to claim 1, wherein the transmission unit includes a signal generation unit and a reduction unit configured to reduce a ripple component included in a signal output from the signal generation unit at a stage prior to the at least two sending transmission lines.

14. A reception apparatus configured to receive a signal from at least two sending transmission lines located with at least either feeding points of a signal or termination points opposed to each other, the reception apparatus comprising:

a receiving transmission line configured to move along the at least two sending transmission lines, establish electromagnetic field coupling with the sending transmission lines, and receive an excited signal; and an output unit configured to receive respective signals from one end and another end of the receiving transmission line corresponding to signals propagating from different directions along the receiving transmission line, and output a signal to be subjected to demodulation processing based on a relationship between the respective signals received from the one end and the another end.

15. A control method for controlling a wireless communication system including a transmission apparatus and a reception apparatus, the transmission apparatus including at least two sending transmission lines located with at least either feeding points of a signal or termination points opposed to each other, and a transmission unit configured to input a signal to the at least two sending transmission lines, the reception apparatus including a receiving transmission line configured to move along the at least two sending transmission lines, establish electromagnetic field coupling with the sending transmission lines, and receive an excited signal, and an output unit configured to receive a signal from the receiving transmission line and output a signal to be subjected to demodulation processing based on the received signal, the control method comprising:

causing the transmission unit to input the signal to each of the feeding points of the at least two sending transmission lines; and causing the output unit to receive respective signals from one end and another end of the receiving transmission line corresponding to signals propagating from different directions along the receiving transmission line, and to output the signal to be subjected to the demodulation processing based on a relationship between the respective signals received from the one end and the another end.

16. A control method for controlling a reception apparatus including a receiving transmission line and an output unit, the receiving transmission line being configured to move along at least two sending transmission lines located with at least either feeding points of a signal or termination points opposed to each other, establish electromagnetic field coupling with the sending transmission lines, and receive an excited signal, the output unit being configured to receive a signal from the receiving transmission line and output a signal to be subjected to demodulation processing based on the received signal, the control method comprising:

causing the output unit to receive respective signals from one end and another end of the receiving transmission line corresponding to signals propagating from different directions along the receiving transmission line, and to output the signal to be subjected to the demodulation processing based on a relationship between the respective signals received from the one end and the another end.

* * * * *